US012752908B2

(12) United States Patent
Brookes et al.

(10) Patent No.: US 12,752,908 B2
(45) Date of Patent: Oct. 6, 2026

(54) PROPULSOR ASSEMBLY WITH TEETER MECHANISM

(71) Applicant: BETA AIR, LLC, South Burlington, VT (US)

(72) Inventors: Kyle Thomas Brookes, Richmond, VT (US); Sebastien Gauthier Perron, Montreal (CA); Daniel Benjamin Spira, Beaconsfield (CA); Read Ferguson Frost, Burlington, VT (US)

(73) Assignee: BETA AIR LLC, South Burlington, VT (US)

( * ) Notice: Subject to any disclaimer, the term of this patent is extended or adjusted under 35 U.S.C. 154(b) by 0 days.

(21) Appl. No.: 18/671,253

(22) Filed: May 22, 2024

(65) Prior Publication Data

US 2025/0346346 A1 Nov. 13, 2025

Related U.S. Application Data

(60) Provisional application No. 63/644,207, filed on May 8, 2024.

(51) Int. Cl.
*B64C 11/18* (2006.01)
*B64C 11/08* (2006.01)

(52) U.S. Cl.
CPC .............. *B64C 11/18* (2013.01); *B64C 11/08* (2013.01)

(58) Field of Classification Search
CPC ......... B64C 11/08; B64C 11/02; B64C 11/04; B64C 11/44; B64C 27/43; B64C 27/54;
(Continued)

(56) References Cited

U.S. PATENT DOCUMENTS 2,475,121 A 7/1949 Avery
2,495,523 A 1/1950 Hays
(Continued)

FOREIGN PATENT DOCUMENTS

CN 112550669 A * 3/2021 ........... B64C 27/473
DE 202007014395 U1 12/2007
(Continued)

OTHER PUBLICATIONS

Merriam-Webster online dictionary "Approximately" retrieved 2025 (Year: 2025).*
(Continued)

*Primary Examiner* — Ryan C Clark
(74) *Attorney, Agent, or Firm* — BRAKE HUGHES BELLERMANN LLP

(57) ABSTRACT

An electric vertical takeoff and landing aircraft including a teetering propulsor assembly is provided. The teetering propulsor assembly includes a propulsor, the propulsor including a monolithic blade including first and second blade portions extending radially outward from a hub, formed as a single unit. The coupling assembly includes a pair of torsional bearings coupled at the hub of the monolithic blade. The torsional bearings allow the monolithic blade to passively teeter in response to external forces applied to the propulsor, and exert a biasing, or centering, or restoring force on the monolithic blade that returns the monolithic blade to a neutral position. The torsional bearings may include an elastomeric member having relatively high stiffness, such as a high capacity laminate bearing.

19 Claims, 17 Drawing Sheets

(58) Field of Classification Search
CPC ... B64C 27/605; B64C 29/0016; B64U 30/20; B64U 50/19
See application file for complete search history.

(56) References Cited

U.S. PATENT DOCUMENTS

| | | | | |
|---|---|---|---|---|
| 2,549,887 | A | 4/1951 | Buivid | |
| 2,626,766 | A | 1/1953 | Mcdonald | |
| 2,669,311 | A | 2/1954 | De et al. | |
| 2,731,215 | A | 1/1956 | Avery | |
| 2,994,386 | A | 8/1961 | Enstrom | |
| 3,052,305 | A | 9/1962 | Jones et al. | |
| 3,109,496 | A | 11/1963 | Ellis et al. | |
| 3,135,334 | A | 6/1964 | Culver | |
| 3,246,862 | A | 4/1966 | Leo et al. | |
| 3,288,226 | A | 11/1966 | Lemont et al. | |
| 3,370,809 | A | 2/1968 | Leoni | |
| 3,461,966 | A * | 8/1969 | Biermann | B64C 11/08 416/234 |
| 3,533,713 | A | 10/1970 | Salmun | |
| 3,554,662 | A | 1/1971 | Lemont | |
| 3,589,831 | A | 6/1971 | Lemnios et al. | |
| 3,762,667 | A | 10/1973 | Pender | |
| 4,092,084 | A | 5/1978 | Barltrop | |
| 4,109,885 | A | 8/1978 | Pender | |
| 4,115,031 | A | 9/1978 | Drees et al. | |
| 4,310,284 | A | 1/1982 | Randolph | |
| 4,443,154 | A | 4/1984 | Randolph | |
| 4,522,563 | A * | 6/1985 | Reyes | B64C 27/43 416/134 A |
| 4,573,873 | A | 3/1986 | Yao et al. | |
| 4,913,411 | A | 4/1990 | Collins et al. | |
| 5,028,210 | A | 7/1991 | Peterson et al. | |
| 5,032,057 | A | 7/1991 | Speer | |
| 5,145,321 | A | 9/1992 | Flux et al. | |
| 5,242,267 | A | 9/1993 | Byrnes et al. | |
| 5,259,729 | A | 11/1993 | Fujihira et al. | |
| 5,263,821 | A | 11/1993 | Noehren et al. | |
| 5,301,900 | A | 4/1994 | Groen et al. | |
| 5,304,036 | A | 4/1994 | Groen et al. | |
| 5,433,669 | A | 7/1995 | Chang et al. | |
| 5,511,947 | A | 4/1996 | Schmuck | |
| 5,826,822 | A | 10/1998 | Rehm | |
| 6,082,968 | A | 7/2000 | Nyhus | |
| 6,161,799 | A | 12/2000 | Nyhus | |
| 6,764,280 | B2 | 7/2004 | Sehgal et al. | |
| 7,097,169 | B2 | 8/2006 | Mueller | |
| 7,448,571 | B1 | 11/2008 | Carter et al. | |
| 7,677,862 | B2 | 3/2010 | Boatner | |
| 7,789,341 | B2 | 9/2010 | Arlton et al. | |
| 8,047,792 | B2 | 11/2011 | Bech et al. | |
| 8,052,094 | B2 | 11/2011 | Roesch | |
| 8,052,500 | B2 | 11/2011 | Van et al. | |
| 8,070,090 | B2 | 12/2011 | Tayman | |
| 8,109,722 | B2 | 2/2012 | Gamble et al. | |
| 8,246,302 | B2 | 8/2012 | Bertolotti | |
| 8,262,358 | B1 | 9/2012 | Muylaert et al. | |
| 8,403,255 | B2 | 3/2013 | Piasecki | |
| 8,583,295 | B2 | 11/2013 | Eglin et al. | |
| 8,690,096 | B2 | 4/2014 | Alvarez Calderon F. | |
| 8,770,934 | B2 | 7/2014 | Perkinson | |
| 8,944,764 | B2 | 2/2015 | Cardell et al. | |
| 8,985,951 | B2 | 3/2015 | Rauber et al. | |
| 8,998,125 | B2 | 4/2015 | Hollimon et al. | |
| 9,126,681 | B1 | 9/2015 | Judge | |
| 9,334,049 | B1 | 5/2016 | Legrand et al. | |
| 9,764,833 | B1 | 9/2017 | Tighe et al. | |
| 9,828,095 | B1 | 11/2017 | Wilcox et al. | |
| 10,150,567 | B2 | 12/2018 | Lauder et al. | |
| 10,308,356 | B2 * | 6/2019 | Hampton | B64C 27/82 |
| 10,384,771 | B2 | 8/2019 | Haldeman et al. | |
| 10,392,098 | B2 | 8/2019 | Baldwin et al. | |
| 10,421,538 | B2 | 9/2019 | Seale et al. | |
| 10,473,107 | B1 | 11/2019 | Newton et al. | |
| 10,494,091 | B2 | 12/2019 | Kizhakkepat et al. | |
| 10,494,095 | B2 | 12/2019 | Groninga et al. | |
| 10,822,079 | B2 | 11/2020 | Schwaiger | |
| 10,960,974 | B2 | 3/2021 | Muren et al. | |
| 11,104,415 | B2 | 8/2021 | Judas et al. | |
| 11,167,845 | B2 | 11/2021 | Schank | |
| 11,186,363 | B2 | 11/2021 | Lauder et al. | |
| 11,203,422 | B2 | 12/2021 | Buesing | |
| 11,267,564 | B2 | 3/2022 | Landry et al. | |
| 11,267,569 | B2 | 3/2022 | Muren et al. | |
| 11,312,484 | B2 | 4/2022 | Bernard | |
| 11,401,031 | B2 | 8/2022 | Ensslin | |
| 11,401,042 | B2 | 8/2022 | Peleg | |
| 11,433,093 | B2 | 9/2022 | George | |
| 11,472,538 | B1 | 10/2022 | Skroski | |
| 11,511,849 | B2 | 11/2022 | Gazzino et al. | |
| 11,511,854 | B2 | 11/2022 | Baity et al. | |
| 11,643,196 | B1 | 5/2023 | Spira et al. | |
| 11,673,659 | B2 | 6/2023 | Howes et al. | |
| 11,673,660 | B1 | 6/2023 | Brookes | |
| 11,814,161 | B2 | 11/2023 | Andryukov et al. | |
| 11,975,829 | B2 | 5/2024 | Sato et al. | |
| 2002/0109044 | A1 | 8/2002 | Rock | |
| 2004/0232280 | A1 | 11/2004 | Carter et al. | |
| 2005/0037685 | A1 | 2/2005 | Helmlinger et al. | |
| 2006/0097103 | A1 | 5/2006 | Atmur | |
| 2006/0102777 | A1 | 5/2006 | Rock | |
| 2006/0231677 | A1 | 10/2006 | Zimet et al. | |
| 2007/0031253 | A1 | 2/2007 | Muren | |
| 2009/0016896 | A1 | 1/2009 | Hill | |
| 2010/0230547 | A1 | 9/2010 | Tayman | |
| 2011/0031355 | A1 | 2/2011 | Alvarez | |
| 2012/0012692 | A1 | 1/2012 | Kroo | |
| 2012/0257974 | A1 | 10/2012 | Mok | |
| 2012/0321472 | A1 | 12/2012 | Davis et al. | |
| 2014/0091172 | A1 | 4/2014 | Arlton et al. | |
| 2014/0265077 | A1 | 9/2014 | Hinks | |
| 2015/0003982 | A1 | 1/2015 | Radovich et al. | |
| 2015/0014475 | A1 | 1/2015 | Taylor et al. | |
| 2015/0086358 | A1 | 3/2015 | Filter | |
| 2015/0226186 | A1 | 8/2015 | Mitsch et al. | |
| 2015/0246725 | A1 | 9/2015 | Reilly | |
| 2015/0314864 | A1 | 11/2015 | Cserfoi | |
| 2016/0001877 | A1 | 1/2016 | Paulos | |
| 2016/0059958 | A1 | 3/2016 | Kvitnevskiy | |
| 2016/0059960 | A1 | 3/2016 | Fearn et al. | |
| 2016/0090178 | A1 | 3/2016 | Paynton | |
| 2016/0236773 | A1 | 8/2016 | Jolly et al. | |
| 2016/0257399 | A1 | 9/2016 | Carter et al. | |
| 2016/0282140 | A1 | 9/2016 | Bergelin et al. | |
| 2016/0340034 | A1 | 11/2016 | Covington et al. | |
| 2017/0021922 | A1 | 1/2017 | Litwinowicz et al. | |
| 2017/0210463 | A1 | 7/2017 | Koessick et al. | |
| 2017/0283051 | A1 | 10/2017 | Radekopf et al. | |
| 2017/0341733 | A1 | 11/2017 | D'Anna et al. | |
| 2018/0017040 | A1 | 1/2018 | Lee | |
| 2018/0141654 | A1 | 5/2018 | Choi et al. | |
| 2018/0257772 | A1 | 9/2018 | Bernhardt | |
| 2018/0362146 | A1 | 12/2018 | Klein et al. | |
| 2019/0002085 | A1 | 1/2019 | Choi et al. | |
| 2019/0016441 | A1 | 1/2019 | Schank et al. | |
| 2019/0047688 | A1 | 2/2019 | Muren et al. | |
| 2019/0047689 | A1 | 2/2019 | Muren et al. | |
| 2019/0118935 | A1 | 4/2019 | Love et al. | |
| 2019/0118943 | A1 | 4/2019 | Machin et al. | |
| 2019/0329882 | A1 | 10/2019 | Baity et al. | |
| 2019/0389569 | A1 | 12/2019 | Paulson et al. | |
| 2020/0102073 | A1 | 4/2020 | Carter et al. | |
| 2020/0148347 | A1 | 5/2020 | Bevirt et al. | |
| 2020/0331602 | A1 | 10/2020 | Mikic et al. | |
| 2020/0377209 | A1 | 12/2020 | Schmaling et al. | |
| 2020/0385130 | A1 * | 12/2020 | Verna | H02K 9/06 |
| 2020/0385139 | A1 * | 12/2020 | Verna | H02K 7/085 |
| 2020/0391860 | A1 | 12/2020 | Foskey et al. | |
| 2021/0009283 | A1 | 1/2021 | Pawliczek | |
| 2021/0039776 | A1 | 2/2021 | Peoples | |
| 2021/0114715 | A1 | 4/2021 | Cravener et al. | |
| 2021/0147091 | A1 | 5/2021 | Deloyer | |
| 2021/0214071 | A1 | 7/2021 | Nyiri et al. | |
| 2021/0221498 | A1 | 7/2021 | Gallagher | |

(56) References Cited

U.S. PATENT DOCUMENTS

| | | | | |
|---|---|---|---|---|
| 2021/0253231 | A1 | 8/2021 | Ensslin | |
| 2021/0284329 | A1 | 9/2021 | Bernard | |
| 2021/0300533 | A1* | 9/2021 | Kizhakkepat | F16F 13/08 |
| 2021/0339881 | A1 | 11/2021 | Bevirt et al. | |
| 2021/0354815 | A1 | 11/2021 | Cravener | |
| 2022/0029488 | A1* | 1/2022 | Belzile | H02K 1/27 |
| 2022/0119102 | A1 | 4/2022 | Shaanan | |
| 2022/0153407 | A1* | 5/2022 | Howes | B64C 27/43 |
| 2022/0274693 | A1 | 9/2022 | Sato et al. | |
| 2022/0355923 | A1 | 11/2022 | Andrews | |
| 2023/0118750 | A1 | 4/2023 | Baskin et al. | |
| 2023/0174225 | A1* | 6/2023 | Hong | B64C 27/08 244/17.23 |
| 2023/0234705 | A1 | 7/2023 | Vora et al. | |
| 2023/0339601 | A1 | 10/2023 | Marshall et al. | |
| 2024/0092493 | A1 | 3/2024 | Orbon et al. | |

FOREIGN PATENT DOCUMENTS

| | | | |
|---|---|---|---|
| DE | 102009012903 | A1 | 9/2010 |
| EP | 1944234 | A1 | 7/2008 |
| FR | 3074778 | A1 | 6/2019 |
| GB | 886582 | A | 1/1962 |
| GB | 2356616 | A | 5/2001 |
| RU | 2155702 | C1 | 9/2000 |
| RU | 2709081 | C1 | 12/2019 |
| WO | 2021030630 | A2 | 2/2021 |
| WO | 2022113086 | A1 | 6/2022 |
| WO | 2002086312 | A1 | 10/2022 |

OTHER PUBLICATIONS

Merriam-Webster online dictionary "Substantially" retrieved 2025 (Year: 2025).*

Casabuono, "Forced Auto", Rotary Wing Forum (https://www.rotaryforum.com/threads/forced-auto.33027), Dec. 6, 2011, 11 pages.

Durkee, et al., "Conceptual Design of an Electric Helicopter Powertrain", IEEE, 2010, 6 pages.

Dvorak, "Teeter Bearing Help Wind Turbines Sssssssh", Windpower Engineering & Development (https://www.windpowerengineering.com/teeter-bearing-help-wind-turbines-sssssssh/), Jul. 18, 2009, 5 pages.

Pavel, "Understanding tile control characteristics of electric vertical take-off and landing (eVTOL) aircraft for urban air mobility", Aerospace Scient and Technology, vol. 125, Jun. 12, 2021, 10 pages.

Shen, et al., "Muitibody Dynamics Mode! of a VTOL Teetering Rotor", AHS Aeromechanics Specialists Conference 2010 (https://www.researchgate.net/publication/239590219_Multibody_Dynamics_Model_of_a_VTOL_Teetering_Rotor), Jan. 20, 2010, 8 pages.

International Search Report and Written Opinion for PCT Application No. PCT/US2025/026866, mailed on Apr. 30, 2026, 17 pages.

* cited by examiner

PROPULSOR ASSEMBLY WITH TEETER MECHANISM

CROSS REFERENCE TO RELATED APPLICATION

This application claims the benefit of U.S. Provisional Application No. 63/644,207, filed May 8, 2024, the disclosure of which is incorporated herein by reference in its entirety.

FIELD

This relates to a propulsor assembly, and in particular, to a propulsor assembly for an aircraft including an electric aircraft.

BACKGROUND

Aircraft may employ one or more propulsor assemblies to propel the aircraft through a medium. In an aircraft configured for vertical takeoff and landing operation, the propulsor assemblies provide for operation of the aircraft in a vertical flight mode of operation of the aircraft, i.e., a vertical takeoff and/or vertical landing and/or hover mode of operation, as well as for operation of the aircraft in a forward flight mode of operation. In some examples, the propulsor assemblies of the aircraft may include one or more first propulsor assemblies that provide vertical propulsive force for operation in the vertical flight mode, and one or more second propulsor assemblies that provide forward propulsive force for operation in the forward flight mode. In some situations, at least some of the propulsor assemblies may experience edgewise flight conditions as the aircraft transitions between the vertical flight mode and the forward flight mode, and asymmetric interactions occur on the advancing and retreating sides of the blades of the propulsor assemblies, resulting in an unsteady pressure field. Edgewise flight conditions experienced by some of the propulsor assemblies may generate vibration that may affect operation of the propulsor assemblies and/or other aircraft systems.

SUMMARY

A propulsor assembly, in accordance with implementations described herein, includes a monolithic blade and a teeter mechanism. Coupling of the monolithic blade to a power source, such as a motor, and mounting on the teeter mechanism, may allow for passive teetering, or passive flapping, or passive deflection, of the monolithic blade of the propulsor assembly. This passive teetering, or passive flapping, may reduce vibration experienced during edgewise flight, and particularly when transitioning between a forward flight mode of operation and a vertical flight mode of operation of an aircraft on which the propulsor assembly is installed. A teeter mechanism, in accordance with implementations described herein, may allow for a certain amount of up-and-down tip displacement of the monolithic blade, for example, per rotation of the blade, to reduce a load experienced by the propulsor assembly.

The details of one or more implementations are set forth in the accompanying drawings and the description below. Other features will be apparent from the description and drawings, and from the claims.

DETAILED DESCRIPTION

An electric vertical takeoff and landing (eVTOL) aircraft may include at least one propulsor assembly. In some examples, the eVTOL aircraft includes a plurality of propulsor assemblies. In some examples, at least some of the plurality of propulsor assemblies operate as lift propulsors, generating vertical thrust to provide for operation of the eVTOL aircraft in a vertical flight mode, i.e., a vertical takeoff mode of operation and/or a vertical landing mode of operation and/or hover mode of operation and/or a transition phase of flight in which the aircraft is transitioning between a thrust borne phase of flight (e.g. hover), and a wing-borne phase of flight, also referred to herein as a fixed wing phase of flight. In some examples, at least one of the plurality of propulsor assemblies generates forward thrust to provide for operation of the eVTOL aircraft in a forward flight mode, or a fixed wing flight mode. In some examples, at least some of the propulsor assemblies include a monolithic propeller, or a monolithic blade, including blade portions that extend radially outward from a hub portion, the blade portions and the hub portion being formed as a single element defining a monolithic structure of the monolithic propeller, or monolithic blade. In some examples, at least some of the propulsor assemblies include a teeter mechanism that allows the blade to pivot, or flap, relative to a rotational axis of the blade. In some examples, the teeter mechanism is a passive teeter mechanism that allows the blade to pivot or flap in response to environmental operating conditions. In some examples, the teeter mechanism includes a biasing device, or a centering device, that defines a pivoting range or a flapping range of the blade and/or controls an amount of pivoting or flapping of the blade. In some examples, the biasing device, or centering device, exerts a restoring force that urges the blade from a deflected position back towards a neutral position. In some examples, a stiffness of the biasing device, or centering device, maintains the pivoting, or teetering, or flapping of the blade within a preset range of motion relative to a pivoting or teetering axis of the blade.

Figure 1:
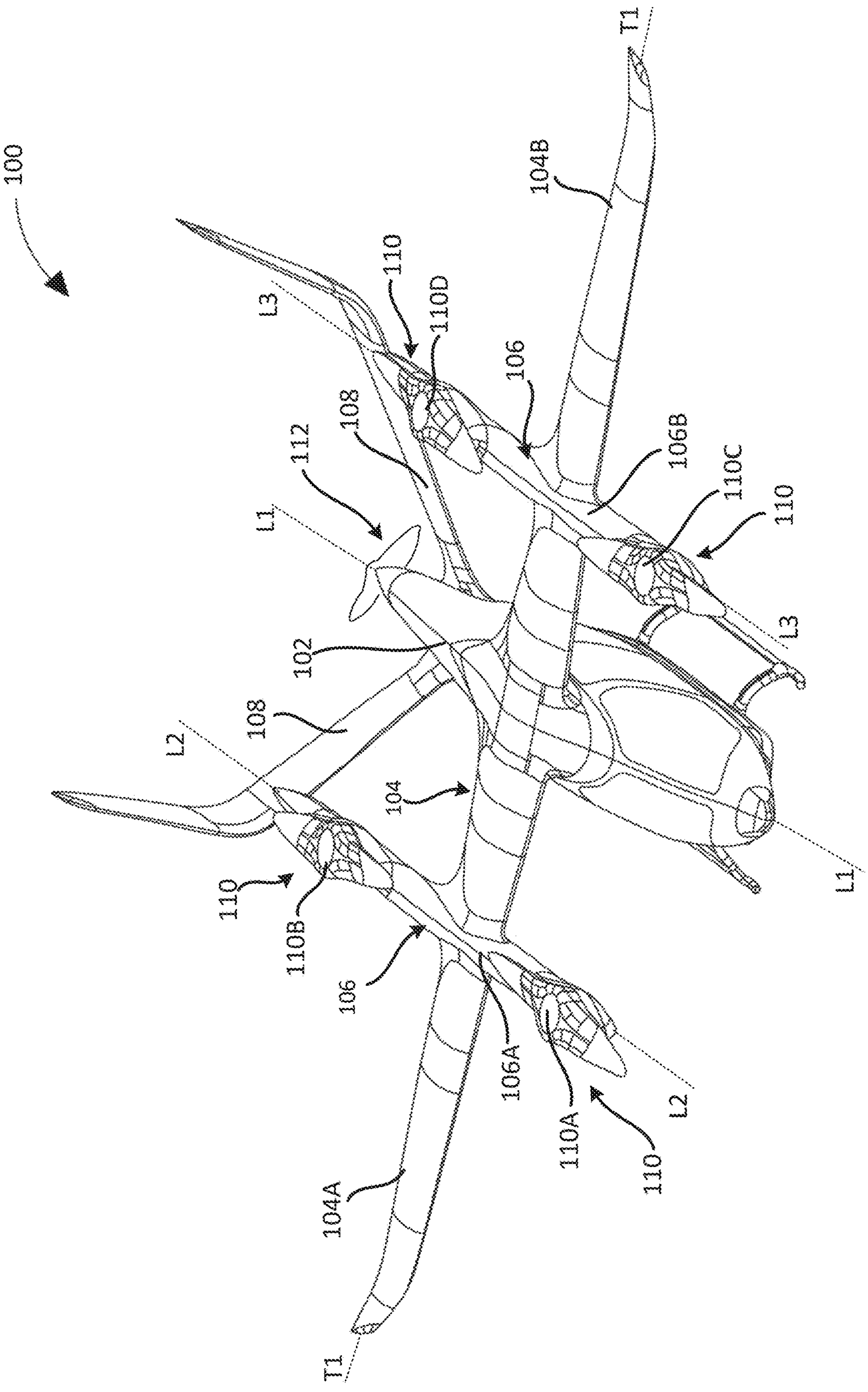
FIG. 1 is a perspective view of an example aircraft.

FIG. 1 is a perspective view of an example aircraft 100. The example aircraft 100 shown in FIG. 1 includes a main body, or fuselage 102. In the example arrangement shown in FIG. 1, laterally extending structural elements, or wings 104, extend outward from opposite lateral side portions of the fuselage 102, in a somewhat transverse arrangement with respect to the fuselage 102. In some examples, a single wing 104 extends across the fuselage 102 and laterally outward from opposite lateral side portions of the fuselage 102. In some examples, the wing 104 includes a first wing 104A extending laterally outward from a first lateral side of the fuselage 102, and a second wing 104B extending laterally outward from a second lateral side of the fuselage 102. A cross-sectional geometry of the wings 104 and/or portions thereof may have a contour corresponding to an airfoil shape, such that a pressure differential between a lower surface and an upper surface of the wing 104 generates lift during flight of the example aircraft 100. In some examples, control surfaces (not separately labeled in FIG. 1) may be provided on the wings 104, and controlled by a pilot to maneuver the example aircraft 100, for example, when in a wing-borne phase of flight.

In this example, the wings 104 are fixed relative to the fuselage 102, and symmetrically arranged with respect to a longitudinal axis L1 of the example aircraft 100. The wings 104 extend along an axis T1, the axis T1 being transverse to the longitudinal axis L1. In the example arrangement shown in FIG. 1, a pair of longitudinally extending structural elements, or booms 106, extend longitudinally, between a respective portion of the wing 104 and a tail structure 108 at an aft portion of the fuselage 102. In this example, a first boom 106A of the pair of booms 106 is aligned along a longitudinal axis L2, separated from the longitudinal axis L1, and transverse to the axis T1, and a second boom 106B of the pair of booms 106 is aligned along a longitudinal axis L3, separated from the longitudinal axis L1 of the fuselage 102, and transverse to the axis T1. The example arrangement of the fuselage 102, the wings 104, the booms 106, and the tail structure 108 of the example aircraft 100 shown in FIG. 1 is provided simply for purposes of discussion and illustration. The concepts to be described herein are applicable to other types of aircraft, including different structural components and/or combinations of components, arranged similarly to or differently from what is shown in FIG. 1.

In the example arrangement shown in FIG. 1, the example aircraft 100 includes a plurality of propulsor assemblies 110. In this example arrangement, the plurality of propulsor assemblies 110 are configured to generate vertical thrust for operation of the example aircraft 100 in a thrust borne or vertical flight mode. In some examples, the plurality of propulsor assemblies 110 may be controlled such that operation of the plurality of propulsors can provide for operation of the example aircraft in the forward flight mode. In the example arrangement shown in FIG. 1, a first propulsor assembly 110A and a second propulsor assembly 110B are coupled on the first boom 106A, and a third propulsor assembly 110C and a fourth propulsor assembly 110D are coupled on the second boom 106B, simply for purposes of discussion and illustration. The principles to be described herein are applicable to other numbers and/or combinations and/or arrangements of propulsor assemblies.

In the example arrangement shown in FIG. 1, the example aircraft 100 includes at least one propulsor assembly 112 configured to generate forward thrust for operation of the example aircraft 100 in the forward flight mode, or fixed wing flight mode. In the fixed wing flight mode, the example aircraft 100 uses lift provided by the wings 104 in combination with the forward thrust/forward airspeed generated by the at least one propulsor assembly 112. In the example arrangement shown in FIG. 1, the at least one propulsor assembly 112 is coupled at an aft end portion of the fuselage 102, for operation as a pusher propulsor, simply for purposes of discussion and illustration. The principles described herein are applicable to arrangements in which a forward thrust propulsor is provided at a different location on the aircraft, and/or in which more than one forward thrust generating propulsor is provided and/or at different locations on the aircraft and/or in different orientation(s) on the aircraft.

In some examples, the aircraft 100 is a vertical takeoff and landing (VTOL) aircraft. In some examples, the aircraft 100 is an electric vertical takeoff and landing (eVTOL) aircraft, in which the propulsor assemblies 110, 112 are driven by at least one power source (not separately labeled in FIG. 1). Hereinafter, simply for purposes of discussion and illustration, operation of the propulsor assemblies 110, 112 of the example aircraft 100 will be described with respect to at least one electric motor (not separately labeled in FIG. 1), simply for purposes of discussion and illustration. The principles described herein are applicable to other types of aircraft, including, for example, unmanned aerial vehicles (UAVs), drones, other types of rotorcraft, and the like, that can be powered by various different power sources including, for example, electric motors, conventionally fueled motors, and/or a combination thereof.

In general, electric motors convert electrical energy into mechanical energy, for example by causing a shaft to rotate. In some examples, an electric motor may be driven by direct current (DC) electric power. In some examples, an electric motor may be driven by electric power having varying or reversing voltage levels, such as alternating current (AC) electric power as produced by an alternating current generator and/or inverter. In some examples, electronic speed controllers and/or other such components may regulate motor speed, direction of rotation, torque output, dynamic braking, and other such operational characteristics of an electric motor. Examples of electric motors include, for example, brushless DC electric motors, permanent magnet synchronous motors, switched reluctance motors, induction motors, and the like.

In some examples, the example aircraft 100 includes an energy source (not separately labeled in FIG. 1) configured to provide energy to the at least one power source. In an example in which the power source is an electric motor, the at least one energy source may include, for example, at least one battery, or a plurality of batteries connected so as to meet an energy or power requirement for a particular flight plan or series of flight plans of the example aircraft 100. In some examples, the example aircraft 100 incorporates other types of energy sources, instead of, or in addition to, a plurality of batteries, including, for example, a generator, a photovoltaic device, a fuel cell (e.g., a hydrogen fuel cell, a direct methanol fuel cell, a solid oxide fuel cell, and the like), other electric energy storage device (e.g. a capacitor, an inductor, and the like), and other such energy sources.

In some examples, the plurality of propulsor assemblies 110 are vertical thrust propulsor assemblies configured to provide vertical thrust when operating the example aircraft 100 in the vertical flight mode, for example, in a vertical takeoff/short takeoff state, a vertical landing/short landing state, a hover state, and the like. In some examples, the at least one propulsor assembly 112 is a forward thrust propulsor assembly configured to provide forward thrust when operating the example aircraft 100 in the forward flight mode. In some examples, the vertical thrust propulsor assemblies 110 may be operated to provide for forward thrust, to operate the example aircraft 100 in the forward flight mode. In some examples, in the forward flight mode, at least some, or all, of the plurality of vertical thrust propulsor assemblies 110 are in a standby mode, such that the example aircraft 100 is propelled forward in response to the thrust generated by forward thrust propulsor assembly 112.

At least some of the propulsor assemblies 110 may experience edgewise flight conditions, particularly as the aircraft 100 transitions between the vertical flight mode and the forward flight mode. This may occur due to, for example, asymmetric interactions on the advancing and retreating sides of blades of the propulsor assemblies 110, resulting in an unsteady pressure field. These external forces may be directed at an edge portion of a propeller of the propulsor assembly. For example, an aircraft may experience edgewise flight conditions when the aircraft travels in a direction orthogonal to a rotational axis of a propeller, causing an air stream to be directed at an edge portion of the propeller. External forces exerted on the propulsor assemblies 110 that are orthogonal to a rotational axis of the propulsor assembly 110, such as, for example, air resistance experienced during edgewise flight, may in turn generate forces that are transverse to the airflow direction, generating moment forces about a drive axis of the propulsor assembly 110, and causing notable stress and strain on components of the propulsor assembly and/or components thereof. Edgewise flight may also occur when an aircraft is traveling in a direction in which a component of the velocity of the aircraft is in a direction orthogonal to a rotational axis of the propeller and parallel to a plane of rotation of the propeller. Edgewise flight may cause excessive flapping of blades of the propeller, including flapping angulation, which may lead to inadvertent displacement of the propeller, and excessive loads on the propulsor assembly 110 and/or components thereof. Edgewise flight conditions experienced by the propulsor assemblies 110 may generate vibration that may affect operation of the propulsor assemblies 110 and/or other aircraft structures and systems, and/or stable operation of the aircraft 100. In some situations, this vibration may adversely impact long term reliability and/or durability of the affected components.

A propulsor assembly including a propeller with a monolithic blade and a teeter mechanism, in accordance with implementations described herein, may allow for passive teetering, or passive flapping, or passive deflection, of the monolithic blade of the propulsor assembly. This passive teetering, or passive flapping, may reduce vibration experienced during edgewise flight, and particularly when transitioning between the vertical flight mode of operation and the forward flight mode of operation. For example, vibrations may be reduced by attenuating the forces exerted on the propeller, or blade, and reducing the transmission of those forces to the larger structure of the propulsor assembly and structural frame of the aircraft. A teeter mechanism, in accordance with implementations described herein, may allow for a certain amount of up-and-down tip displacement of the monolithic blade, for example, per rotation of the blade, to reduce a load experienced by the propulsor assembly.

Figure 2A:
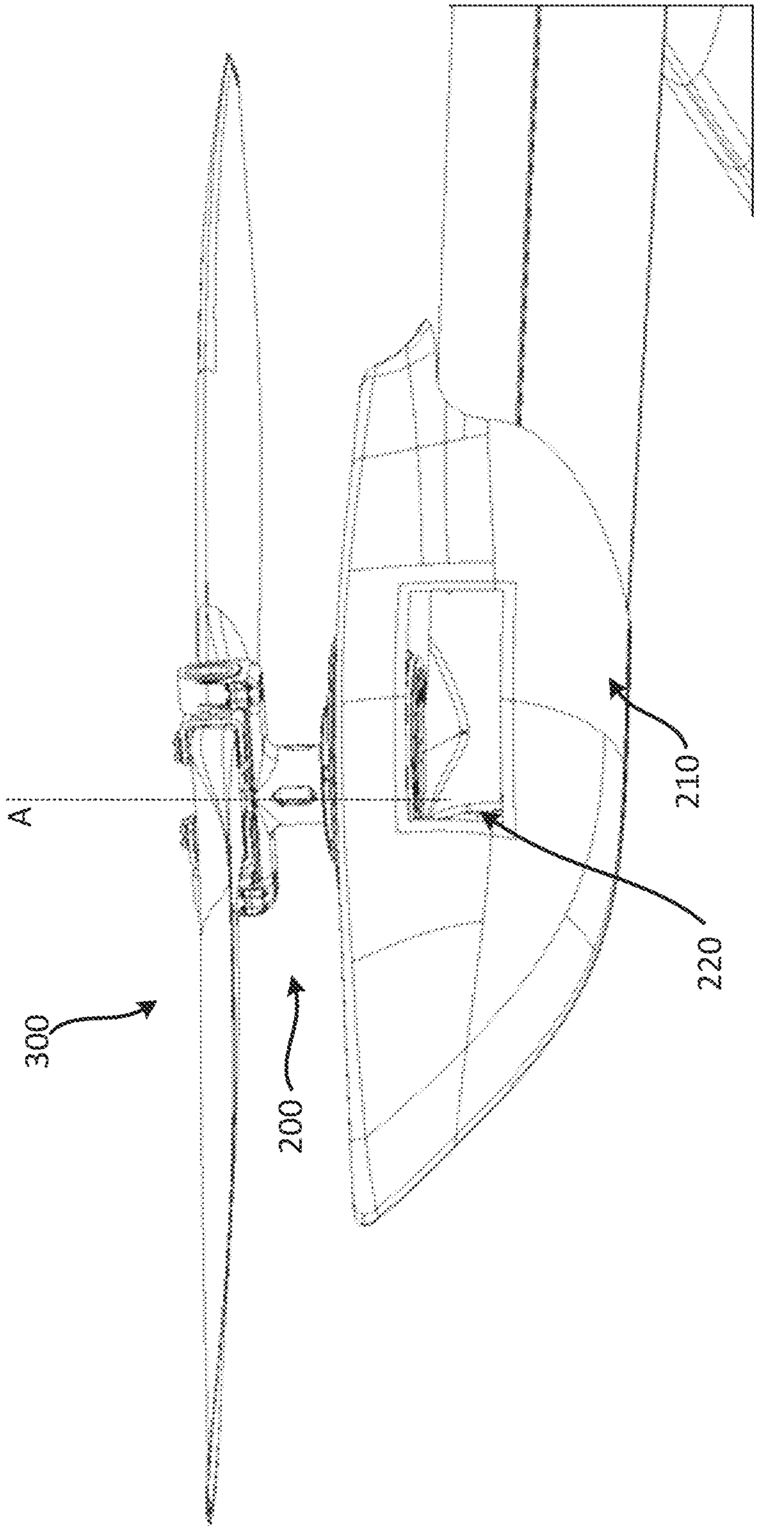
FIG. 2A illustrates an example propulsor assembly.

An example propulsor assembly 200 is shown in FIG. 2A. The example propulsor assembly 200 may be representative of one of the propulsor assemblies 110 of the example aircraft 100 shown in FIG. 1, or of another aircraft not explicitly shown herein. The propulsor assembly 200 may be coupled to, or mounted on a structural element 210 of the aircraft, such as, for example, the boom 106 of the example aircraft 100 shown in FIG. 1, or another structural element, based on a configuration of the aircraft to be powered by the propulsor assembly 200. A propulsor 300 may be mounted on the structural element 210, with a power source, for example a motor 220, providing power to the propulsor 300. The propulsor 300 may be coupled to the motor 220 such that the propulsor 300 rotates together with the motor 220 about an axis A. In some examples, a plane of rotation of the propulsor 300, corresponding to a plane in which a blade of the propulsor 300 rotates, is substantially orthogonal to the rotational axis A of the propulsor 300.

Figure 2B:
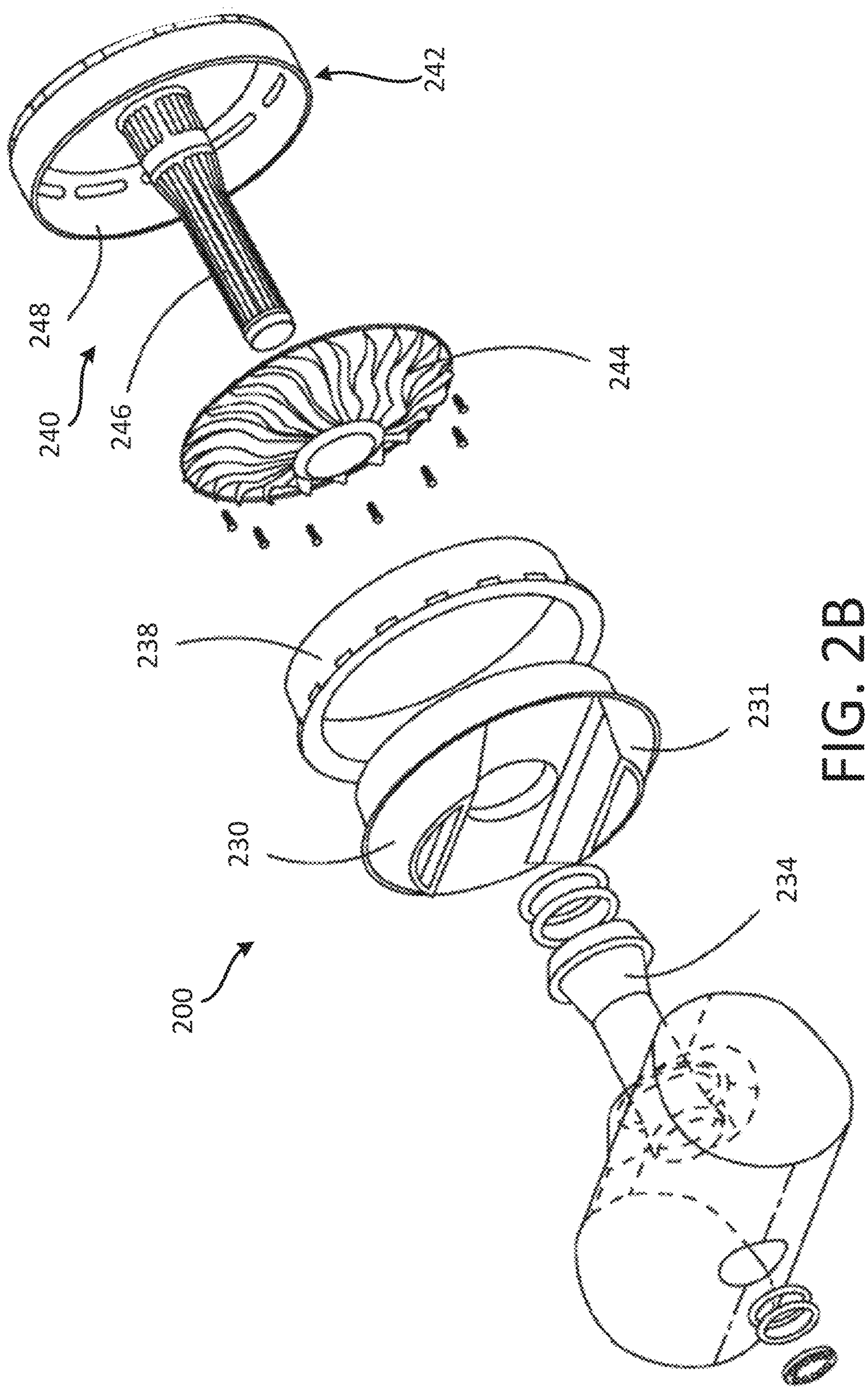
FIG. 2B is an exploded perspective view of an example motor of the example propulsor assembly shown in FIG. 2A.

FIG. 2B is an exploded perspective view of the example motor 220. The example motor includes a rotor 240 and a stator 230. The stator 230 includes a first magnetic element 231 that generates a magnetic field. In some examples, the first magnetic element 231 includes one or more magnets arranged on an outer magnet carrier 238. In some examples, the one or more magnets may include one or more permanent magnets. In some examples, the one or more magnets may include one or more electromagnets that generate magnetic fields via induction. The magnetic field generated by the first magnetic element 231 causes a second magnetic element 242, fixed to a rotor shaft 246, to rotate. In some examples, the first magnetic element 231 generates a variable magnetic field using, for example, an inverter, a controller, and the like. The second magnetic element 242 may include one or more magnetic elements, for example, one or more permanent magnets and/or one or more electromagnets, arranged on an inner magnet carrier 248, that generate a magnetic field configured to interact with first magnetic element 231. Poles of the second magnetic element 242 may be oriented in a second direction, opposite the first direction of poles of the magnets of the first magnetic element 231, causing attraction between the first and second magnetic elements 231, 242. Interaction of the first and second magnetic elements 231, 242 may produce torque, which is transmitted to the rotor shaft 246, causing the rotor shaft 246 to rotate. The assembly may be coupled to a hub portion 312 of a blade 310 of the propulsor 300 (see FIGS. 3A-3C), such that the blade 310 rotates in response to rotation of the stator 230. In some examples, an impeller 244 is coupled with the rotor shaft 246 to increase or decrease the pressure and/or flow of a fluid, including air and provide for cooling of the motor 220. The rotor shaft 246 may be inserted into a bore formed in a bearing cartridge 234 attached to a structural element of the aircraft, to support the rotor 240 and to transfer the loads from the motor 220 including, for example, weight, power, magnetic pull, pitch errors, out of balance situations, and the like.

Figure 3A:
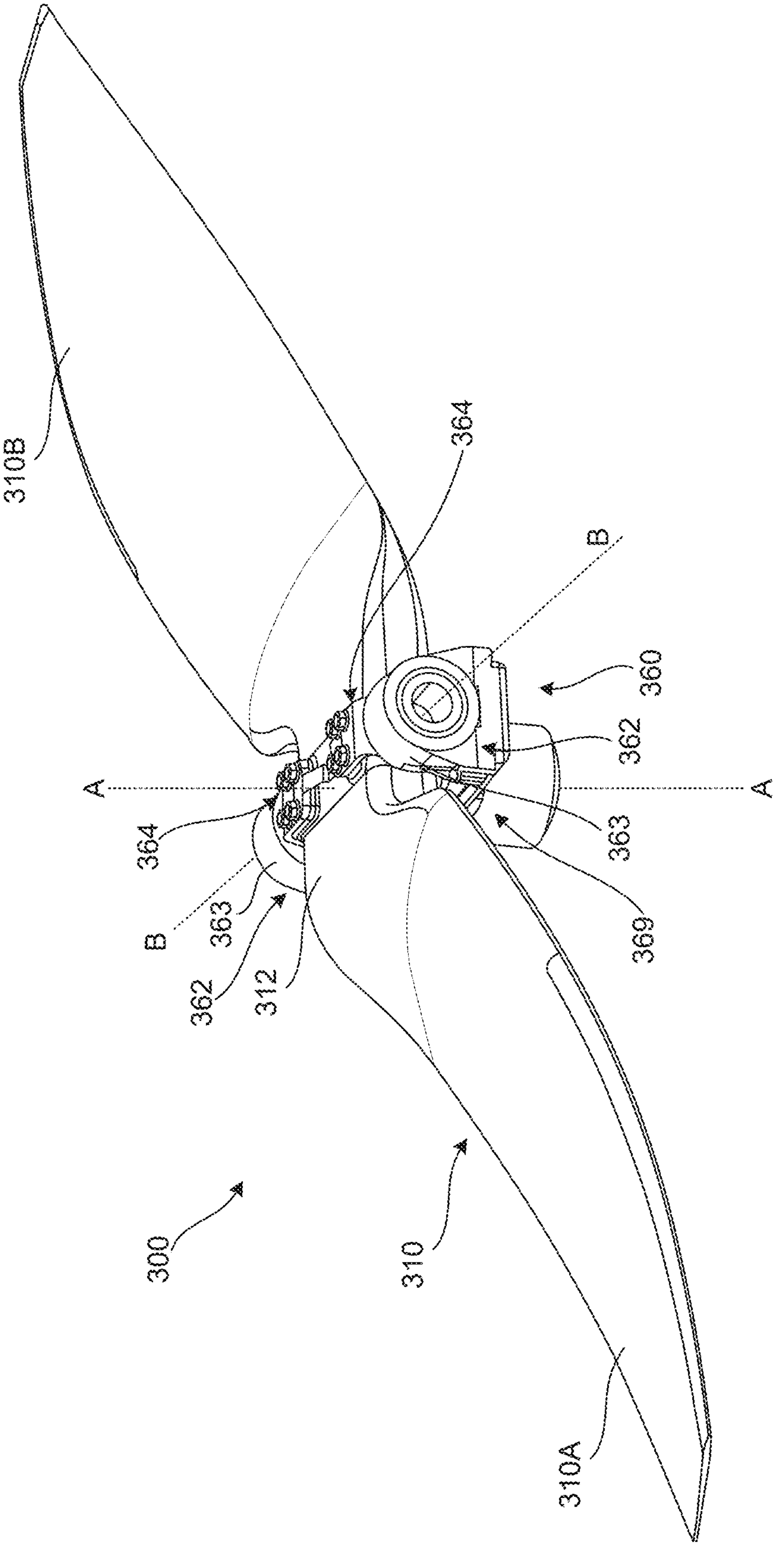
FIG. 3A is a perspective view of an example propulsor of the example propulsor assembly shown in FIG. 2A.
Figure 3B:
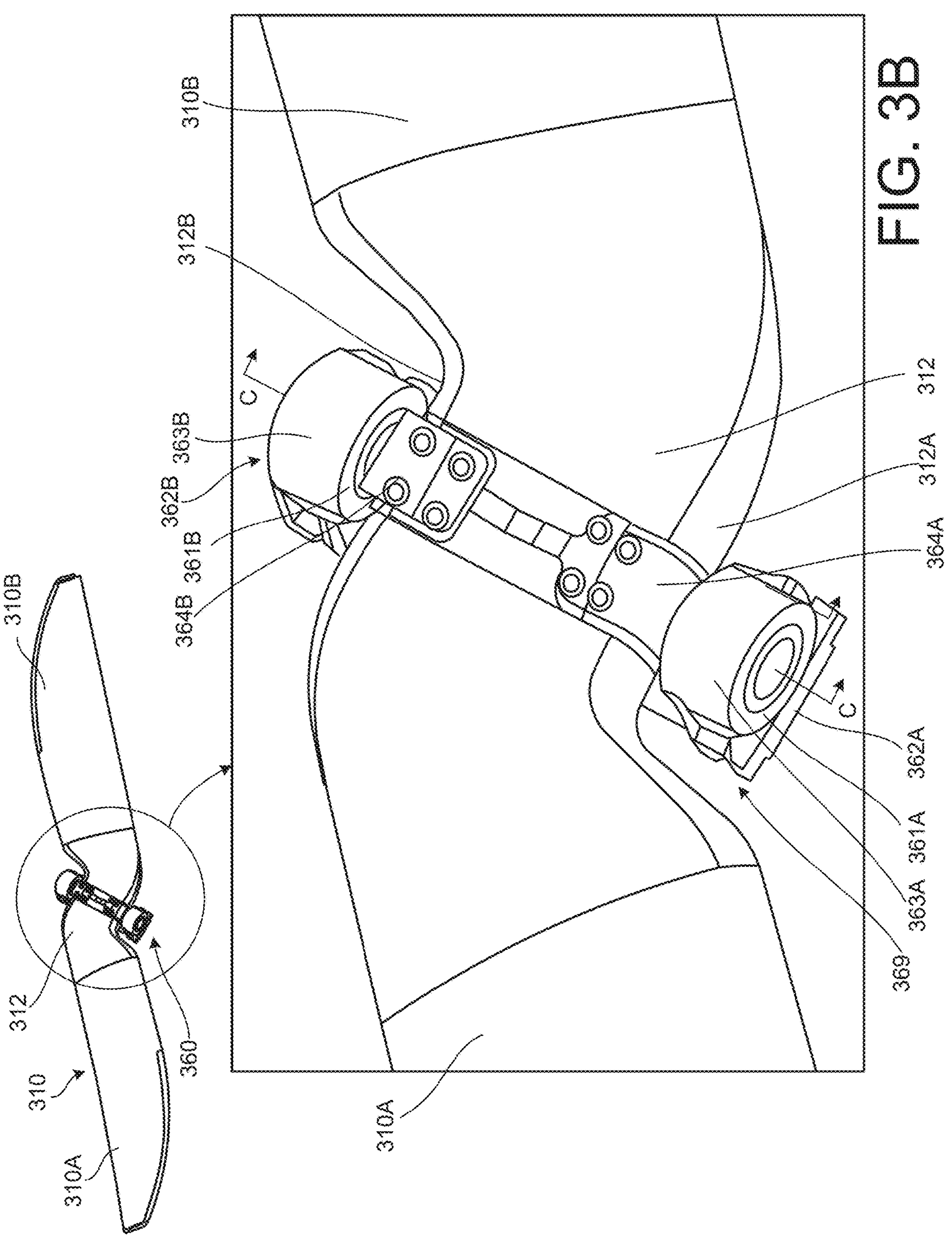
FIG. 3B is a top view of the example propulsor shown in FIG. 3A.
Figure 3C:
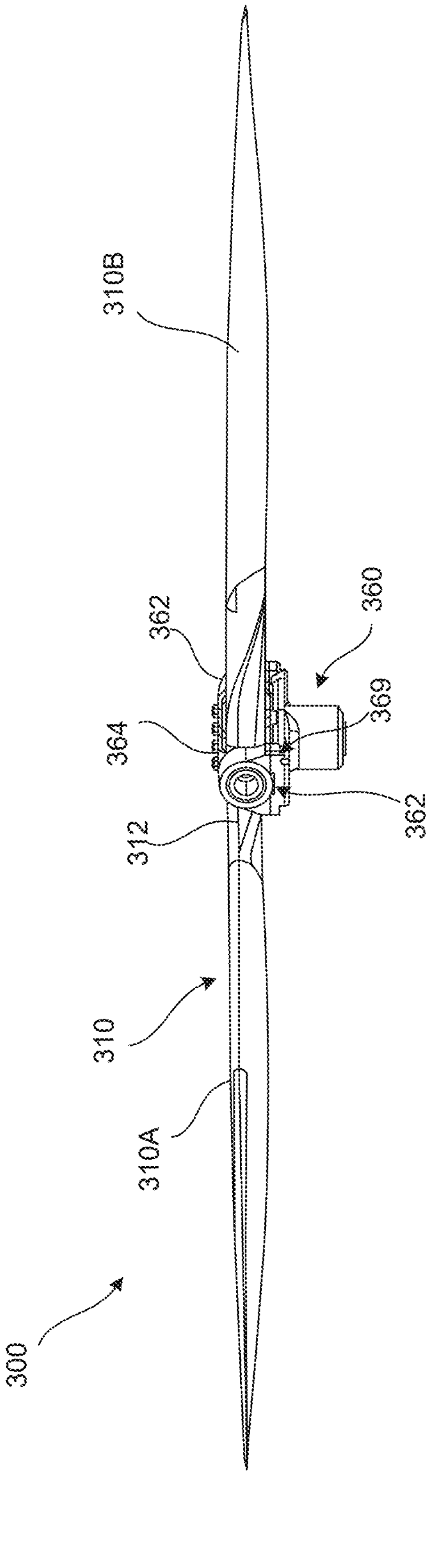
FIG. 3C is a side, span view of the example propulsor shown in FIGS. 3A and 3B.
Figure 3D:
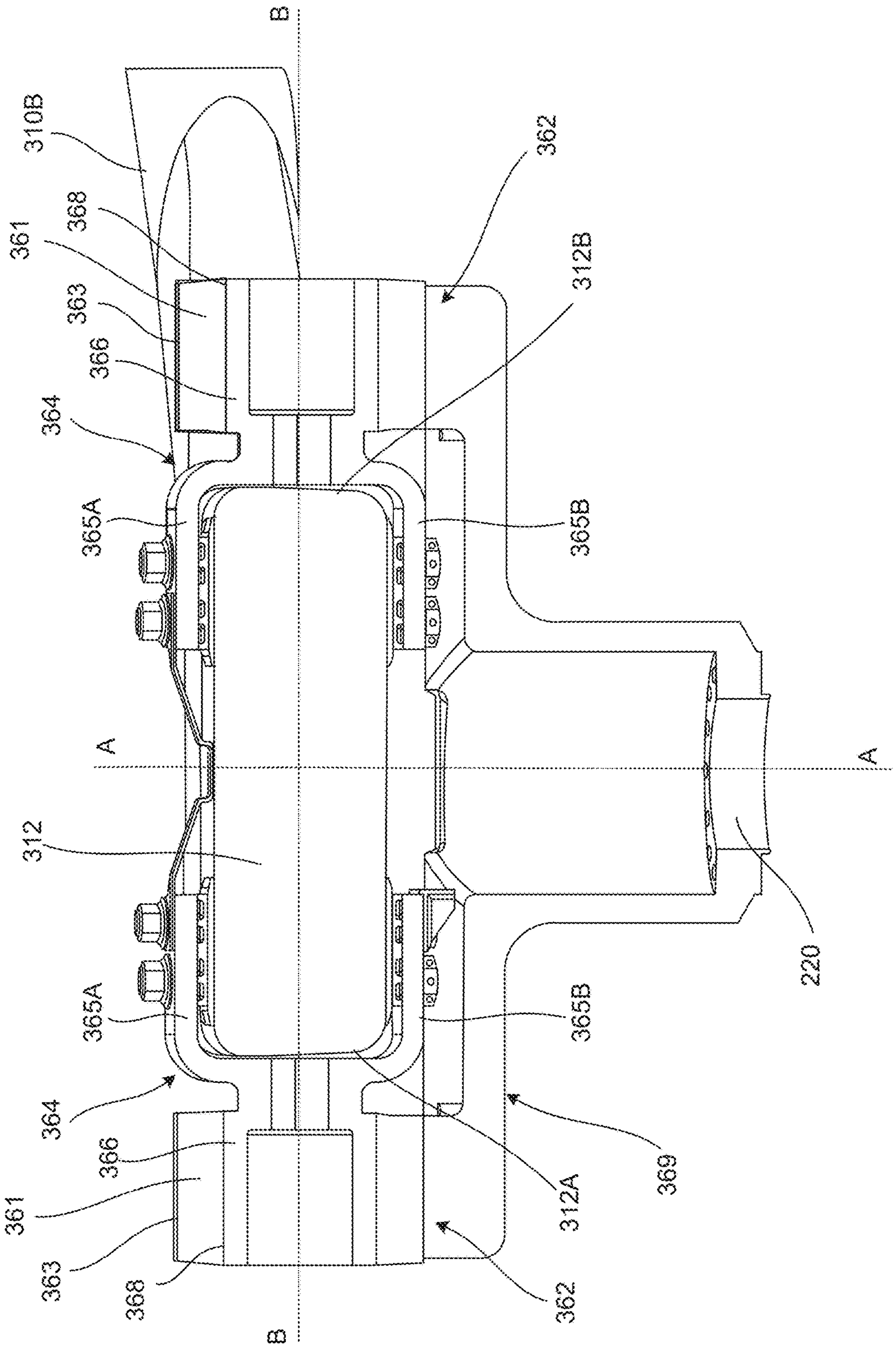
FIG. 3D is a cross-sectional view taken along line C1-C1 shown in FIG. 3B, illustrating characteristics of an example bearing of the example propulsor shown in FIGS. 3A and 3B, in accordance with an implementation.

FIG. 3A is a perspective view of the example propulsor 300 shown in FIG. 2A. FIG. 3B is a top view, and FIG. 3C is a side, span view of the example propulsor 300. FIG. 3D is a cross-sectional view taken along line C-C shown in FIG. 3B.

The example propulsor 300 includes a blade 310, with a coupling assembly 360 coupling the blade 310 to an output shaft of the motor 220. The blade 310 includes a first blade portion 310A and a second blade portion 310B, each extending radially outward from a hub portion 312 of the blade 310. In some examples, the hub portion 312, the first blade portion 310A and the second blade portion 310B are formed as a continuous, single, unitary element, being integrally formed to define the blade 310. The first blade portion 310A, the second blade portion 310B, and the hub portion 312 define a single, continuous blade including an integral hub. In some examples, the blade 310 includes an outer structural layer that extends continuously across the first blade portion 310A, the second blade portion 310B, and the hub portion 312, for example, from a tip end portion of the first blade portion 310A, through the hub portion 312, to a tip end portion of the second blade portion 310B, along upper and lower surfaces of the blade 310, such that the outer structural layer of the blade 310 has a monolithic structure. In some examples, due to the unitary, or monolithic structure of the blade 310, pitch of the first blade portion 310A and the second blade portion 310B is not independently adjustable. When incorporated into a vertical lift propulsor, for example, in an application such as the example aircraft 100 described above, the vertical lift propulsors operate as fixed pitch propulsors.

The coupling assembly 360 is coupled between the hub portion 312 of the blade 310 and the motor 220, for example, to an output shaft of the motor 220. The coupling of the blade 310 to the motor 220 by the coupling assembly 360 allows the blade 310 to rotate together with the output shaft of the motor 220 about an axis A shown in FIG. 3A. The coupling assembly 360 includes a yoke 369 configured to provide for coupling to the motor 220. Bearings 362 are mounted on the yoke 369, at positions on the yoke 369 corresponding to opposite side portions of the hub portion 312 of the blade 310. Brackets 364 mounted on the opposite side portions of the hub portion 312 are respectively coupled to the bearings 362, to in turn, couple the blade 310 to the motor 220 via the yoke 369. In particular, as shown in FIG. 3B, a first bracket 364A is coupled to a first side portion 312A of the hub portion 312 of the blade 310. A first bearing 362A is coupled between the yoke 369 and the first bracket 364A. The first bearing 362A includes a first biasing member 361A, or a first centering member, received in a first bearing housing 363A, between the first bearing housing 363A and a base portion 366 of the first bracket 364A. Similarly, a second bracket 364B is coupled to a second side portion 312B of the hub portion 312 of the blade 310. A second bearing 362B is coupled between the yoke 369 and the second bracket 364B. The second bearing 362B includes a second biasing member 361B, or a centering member, received in a second bearing housing 363B between the second bearing housing 363B and a base portion 366 of the second bracket 364B.

As illustrated in the cross-sectional view shown in FIG. 3D, each of the brackets 364 includes a u-shaped arrangement of arm portions that extend from a base portion 366 toward the hub portion 312 of the blade 310. In this example arrangement, a first arm portion 365A extends from the base portion 366 to an upper surface of the hub portion 312, where the first arm portion 365A is fixed to the hub portion 312 of the blade 310. A second arm portion 365B extends from the base portion 366 to a lower surface of the hub portion 312, where the second arm portion 365B is fixed to the hub portion 312 of the blade 310. Thus, the first side portion 312A and the second side portion 312B of the hub portion 312 of the blade 310 are each received between the first arm portion 365A and the second arm portion 365B of the respective bracket 364. The first arm portion 365A and second arm portion 365B are fixed to the hub portion 312 to couple the blade 310 to the coupling assembly 360. In this example arrangement, one or more fasteners are used to fix the first arm portion 365A and the second arm portion 365B of the brackets 364 to the hub portion 312 of the blade 310, simply for purposes of discussion and illustration. Other methods may be used to fix the bracket 364 to the hub portion 312 of the blade 310. In this example arrangement, the base portion 366 of the bracket 364 is received in a central opening 368 formed in the respective bearing 362.

In the example arrangement shown in FIG. 3D, the biasing members 361, or centering members, and the base portion 366 of the brackets 364 are concentrically arranged relative to the axis B. In the example arrangement shown in FIG. 3D, the axis B, defining a pivoting axis or flapping axis or a teetering axis of the blade 310, is substantially orthogonal to the axis A, defining a rotational axis of the blade 310. The example coupling assembly 360 including the yoke 369, the bearings 362 and the brackets 364 allow the propulsor 300 including the blade 310 to rotate together with the output shaft of the motor 220 about the axis A. The example coupling assembly 360 including the yoke 369, the bearings 362 and the brackets 364 also defines a teeter mechanism, also referred to as a flapping mechanism, that allows the propulsor 300 including the blade 310 to pivot, or teeter, or flap, about an axis B. In particular, such a teeter mechanism may allow the blade 310 to passively pivot, or teeter, or flap about the axis B in response to external forces experienced by the propulsor 300 during edgewise flight, and particularly during transition between operation in the forward flight mode and the vertical flight mode.

Figure 5A:
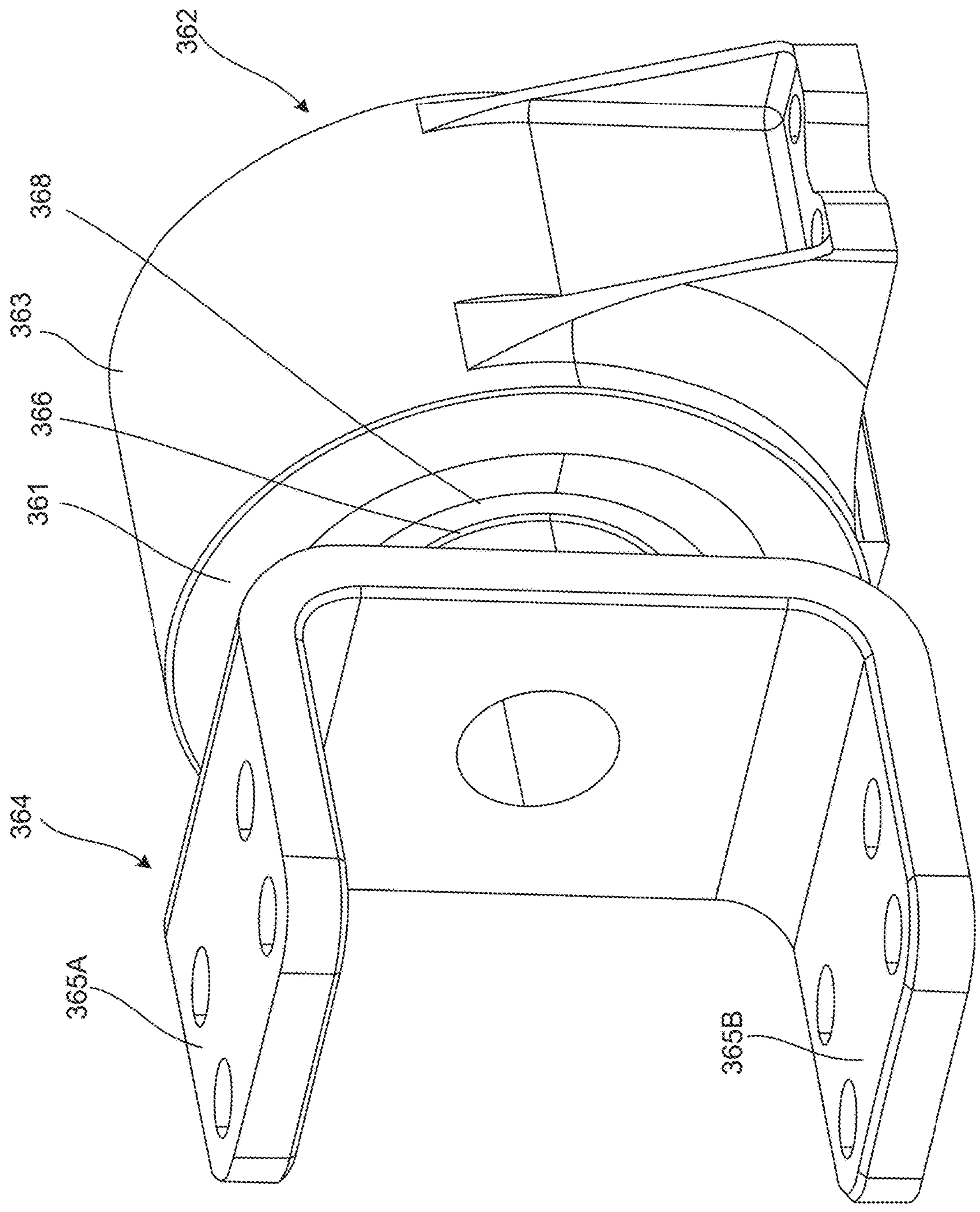
FIG. 5A is a first perspective view.
Figure 5B:
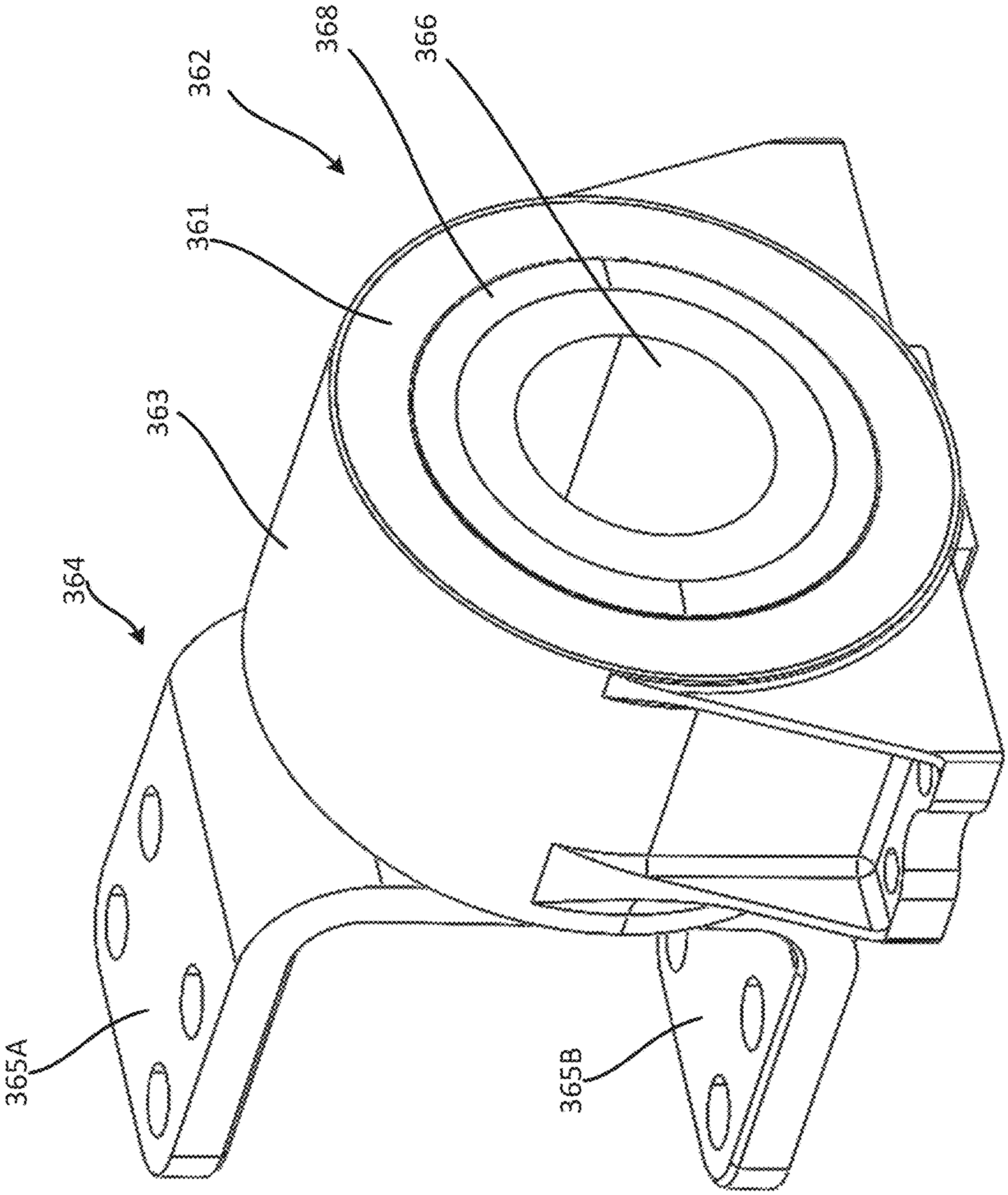
FIG. 5B is a second perspective view, of an example bearing of the example propulsor shown in FIGS. 3A-3C.

FIG. 5A is a first perspective view, and FIG. 5B is a second perspective view, of one of the bearings 362. The views illustrated in FIGS. 5A and 5B may be representative of the first bearing 362A and/or the second bearing 362B described above. In some examples, at least one of the bearings 362 (the first bearing 362A and/or the second bearing 362B) is a torsional bearing, or a rotational spring damper, including the biasing member 361, or centering member, defining a torsional spring member of the bearings 362. In some examples, the biasing member 361, or centering member, is received in the bearing housing 363, for example, between an inner surface of the bearing housing 363 and an outer surface of the base portion 366 of the brackets 364. In some examples, the biasing member 361, or centering member, has a relatively high stiffness, to allow for pivoting, or teetering, of the blade 310 about the axis B as described above, while exerting a centering force, or a restoring moment, that urges the blade 310 back towards a neutral position, and/or that is sufficient to return the blade 310 to the neutral position and/or to maintain a degree of pivoting or teetering of the blade 310 to within a previously set limit or range of motion. In some examples, the bearings 362 are bi-directional bearings, exerting a centering force, or restoring moment, in a first direction in response to a pivoting or teetering of the blade 310 in a first rotational direction, and exerting a centering force, or restoring moment, in a second direction in response to a pivoting or teetering of the blade in a second rotational direction.

In this example arrangement, the biasing member 361, or centering member, is in the form of an annular elastomeric member, simply for purposes of discussion and illustration. The biasing member 361, or centering member, in the form of an annular elastomeric member as shown in FIGS. 5A and 5B, is received between an inner surface of the bearing housing 363 and an outer surface of the base portion 366 of the bracket 364. In the example arrangement shown in FIGS. 5A and 5B, in which the biasing member 361, or centering member, is an annular elastomeric member, an inner peripheral surface of the biasing member 361, or centering member, may be fused to an outer peripheral surface of the base portion 366 of the brackets 364, and an outer peripheral surface of the biasing member 361, or centering member, may be fused to an inner peripheral surface of the bearing housing 363. In some configurations (not shown), the inner peripheral surface of the base portion 366 of the bracket 364 may be coupled to the outer peripheral surface of the biasing member 361, or centering member. The use of an elastomeric member as the biasing member 361, or centering member, of one or both of the bearings 362 allows for absorption of both axial and radial movement within the bearing 362, in addition to the torsional damping provided by elastomeric members forming the biasing member 361, or centering member, in response to the pivoting of the blade 310 about the axis B.

Figure 4A:
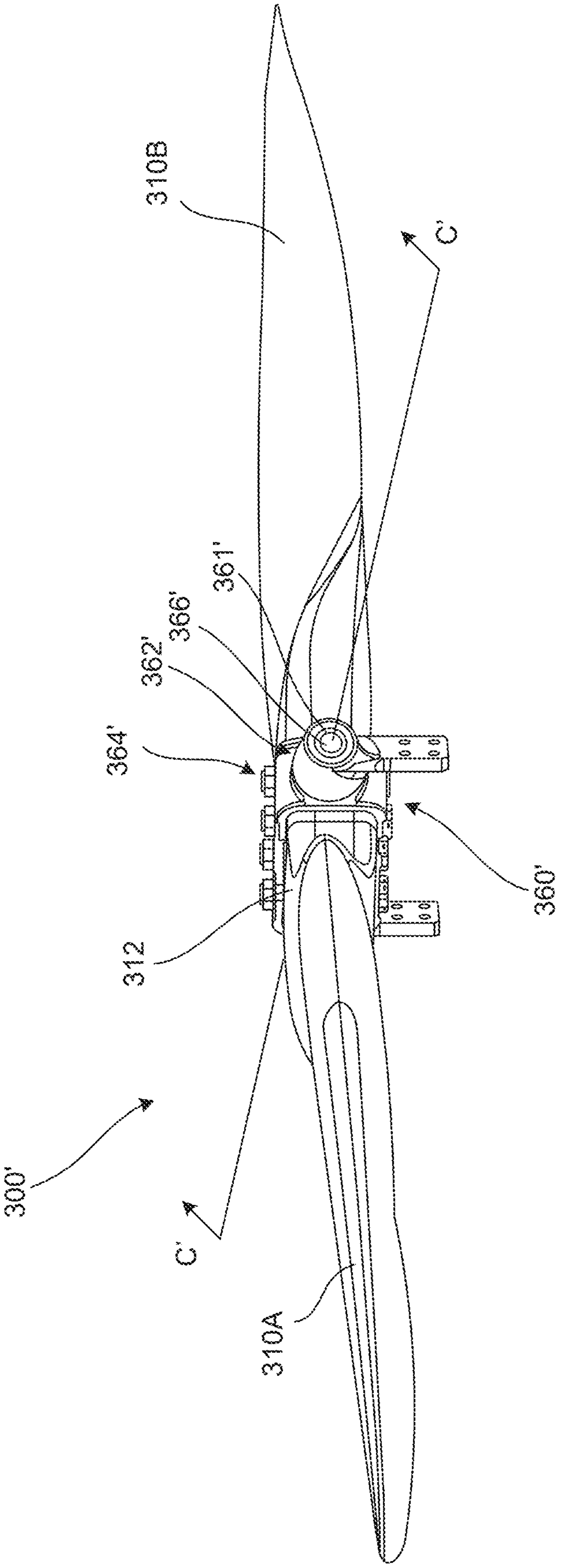
FIG. 4A is a side, span view of an example propulsor including an example coupling assembly.
Figure 4B:
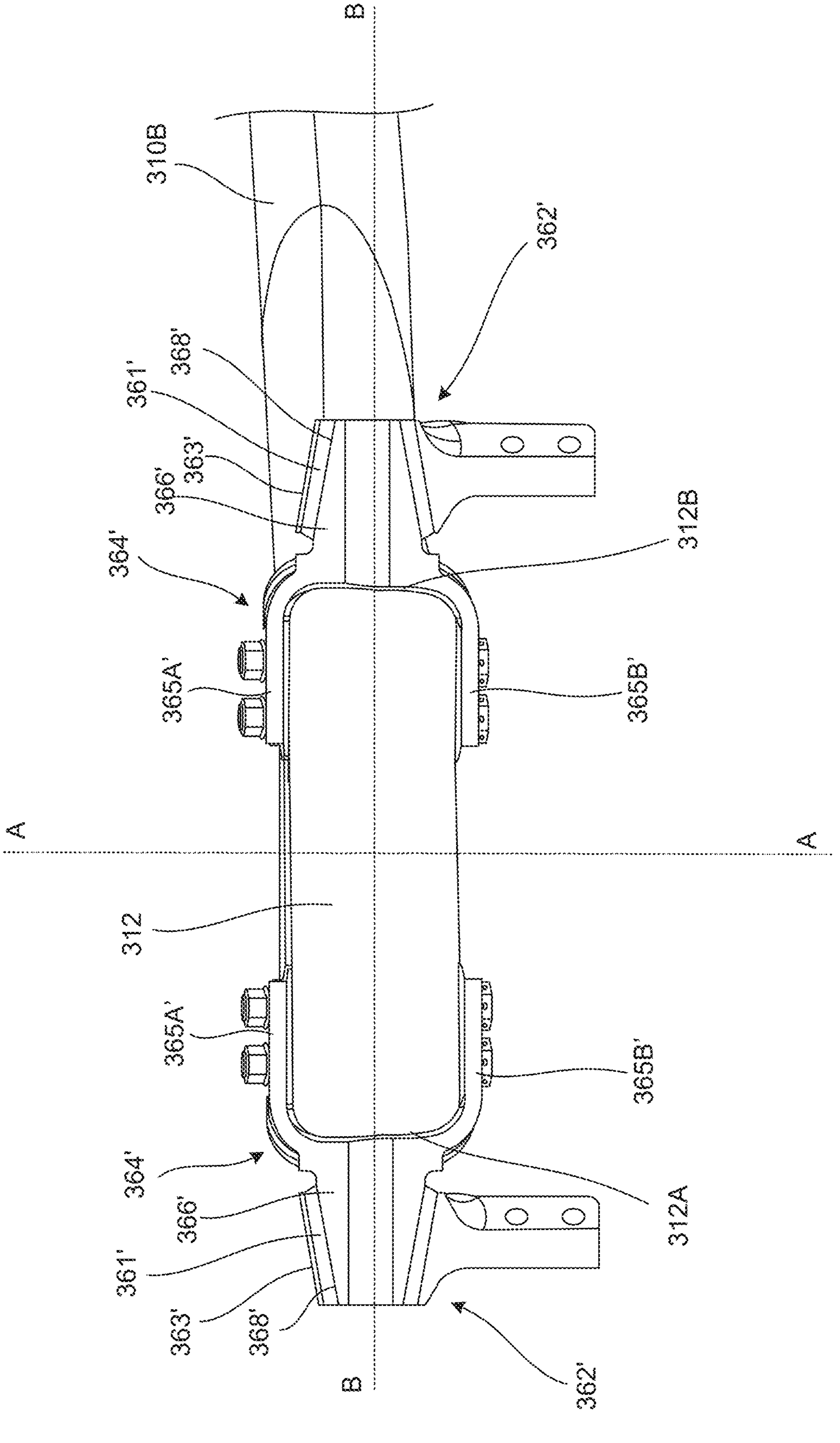
FIG. 4B is a cross-sectional view of the example propulsor shown in FIG. 4A, taken along line C'-C' of FIG. 4A, in accordance with another implementation.

In the example arrangement shown in FIGS. 3A-3D, the bearings 362 are torsional bearings each including an annular elastomeric member as the biasing member 361, or centering member, with a substantially cylindrical base portion 366 of the brackets 364 fused with a substantially annular central opening 368 in the biasing member 361, or centering member, simply for purposes of discussion and illustration. The principles described herein are applicable to differently configured biasing, or centering members, including biasing, or centering members that make use of elastomeric members, and biasing, or centering members making use of other biasing, or centering mechanisms that would exert a restoring force urging the blade 310 back towards the neutral position. For example, FIGS. 4A and 4B illustrate an example propulsor 300' including a blade 310 as described above, with a coupling assembly 360' coupling the blade 310 to a power source such as, for example a motor (not shown in FIGS. 4A and 4B). The coupling assembly 360' includes bearings 362' supporting the first side portion 312A and the second side portion 312B of the hub portion 312 of the blade 310. The bearings 362' each include brackets 364' received in a bearing housing 363', with a biasing member 361', or centering member, positioned between the base portion 366' of the bracket 364' and the housing 363'.

Each bracket 364' includes a first arm portion 365A' and a second arm portion 365B' extending from a base portion 366'. In the example implementation shown in FIGS. 4A and 4B, the base portion 366' of the brackets 364' is conical, or tapered. In the example implementation shown in FIGS. 4A and 4B, a dimension, for example, a diameter of an end of the base portion 366' proximate the first and second arm portions 365A', 365B' is greater than a dimension, for example a diameter, of a second end of the 366', such that the dimension, for example the diameter, of the base portion 366' gradually decreases in an outboard direction of the hub portion 312 of the blade 310. The base portion 366' of the bracket 364' is received in a central opening 368' of the biasing member 361', or centering member. In some examples, an inner peripheral portion of the biasing member 361', or centering member is coupled to, for example, fused to an outer peripheral portion of the base portion 366' of the bracket 364', and an outer peripheral portion of the biasing member 361', or centering member is coupled to, for example, fused to an inner peripheral portion of the bearing housing 363'.

In the implementations described above with respect to FIGS. 3A-3D and/or FIGS. 4A and 4B, a variation in a size and/or a shape and/or an amount of surface contact of the biasing, or centering member with the mating surfaces of the brackets and/or bearings may affect various characteristics of the bearings such as, for example, a length and/or a thickness of the elastomeric member, a torsional stiffness provided by the bearing, and other such characteristics. In some examples, a stiffness of the biasing members 361, 361', or centering members, of the bearings 362, 362' may be great enough so that a biasing, or centering force, or restoring moment, exerted by the bearings 362, 362' urges the blade 310 toward the neutral position of the blade 310, and/or restricts or prevents teetering of the blade 310 beyond a set range/beyond a set amount of up-down displacement of a tip end portion of the blade 310, teetering of the blade 310 in response to external forces not associated with edgewise flight and/or transition between modes of flight, and the like. In some examples, the biasing members 361, 361', or centering members, are configured to exert a biasing force, or a centering force, or a restoring moment in multiple directions, based on a direction of an externally applied force. For example, the biasing members 361, 361', or centering members, may exert a centering force, or restoring moment, in a first direction in response to a pivoting or teetering of the blade 310 in a first rotational direction, and may exert a centering force, or restoring moment, in a second direction in response to a pivoting or teetering of the blade in a second rotational direction.

In some examples, a stiffness of the bearings 362 and/or the bearings 362' is determined by balancing a thrust output capability of a propulsor (and in particular, the propeller/blade of the propulsor) with a range of rotational speed (i.e., rpm) associated with operation of the propulsor and/or a boom clearance requirement associated with the propulsor to which the bearings 362 and/or the bearings 362' are coupled. In some situations, increasing bearing stiffness may increase a blade to boom clearance and/or reduce flapping, but may increase vibrational forces transmitted to the support structure of the propulsor and/or aircraft. In some examples, a stiffness provided by the pair of bearings 362 (i.e., a combined stiffness of the first bearing 362A and the second bearing 362B) and/or the pair of bearings 362' supporting the example blade 310 described above may be within a range of approximately 120 Ft-Lbf/degree to approximately 150 Ft-Lbf/degree. In some examples, the stiffness provided by the pair of bearings 362 and/or the pair of bearings 362' supporting the example blade 310 described above may be approximately 135 Ft-Lbf/degree. This may represent a considerably greater level of bearing stiffness, for example, torsional bearing stiffness, provided to the coupling of the example blade 310 to the motor as described above when compared to, for example, a traditional helicopter rotor configuration. In some examples, this may represent an approximately 10 to 20 times increase in bearing stiffness, for example torsional bearing stiffness, when compared to, for example, a traditional helicopter rotor configuration.

A stiffness within this range may maintain the pivoting or teetering or flapping of the blade 310 about the axis B within a preset range of motion, and may generate a restoring force large enough to urge the blade 310 towards the neutral position and/or return the blade 310 to a neutral position. In some examples, the biasing members 361, or centering members, of the bearings 362 are elastomeric members. In some examples, the bearings 362 are high capacity laminated (HCL) elastomeric bearings. In some examples, the elastomeric material is a blend of natural and synthetic rubber, formulated based on, for example, bearing geometry, propulsor geometry, load/forces exerted on the bearing, and the like.

Figure 6A:
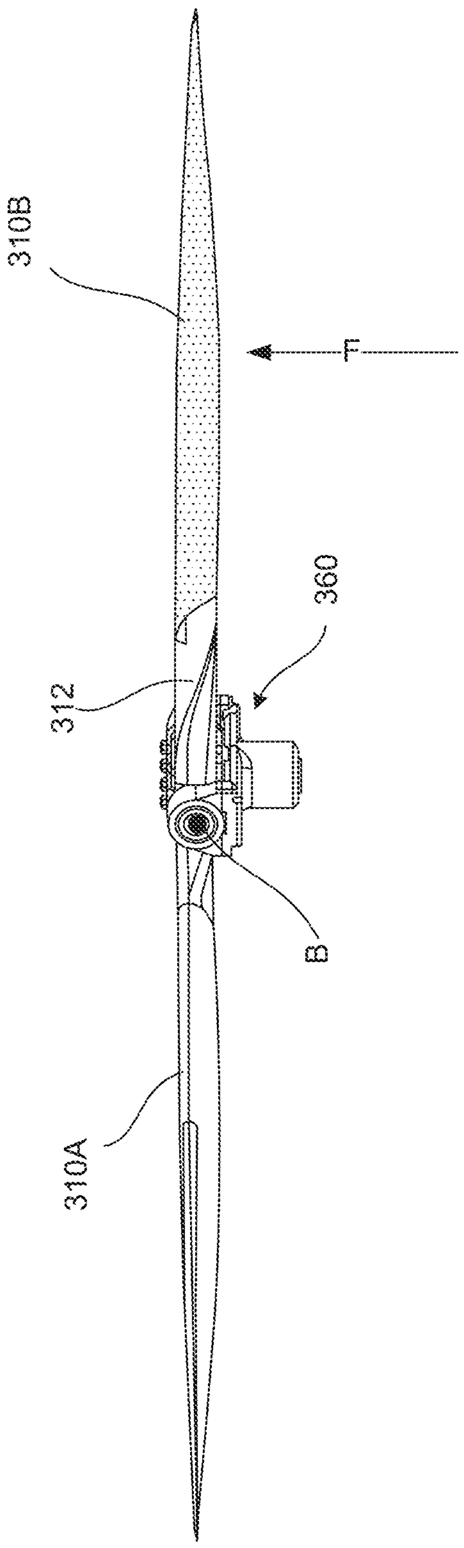
FIG. 6A is a side, span view of the example propulsor shown in FIGS. 3A-3C, in a neutral state.
Figure 6B:
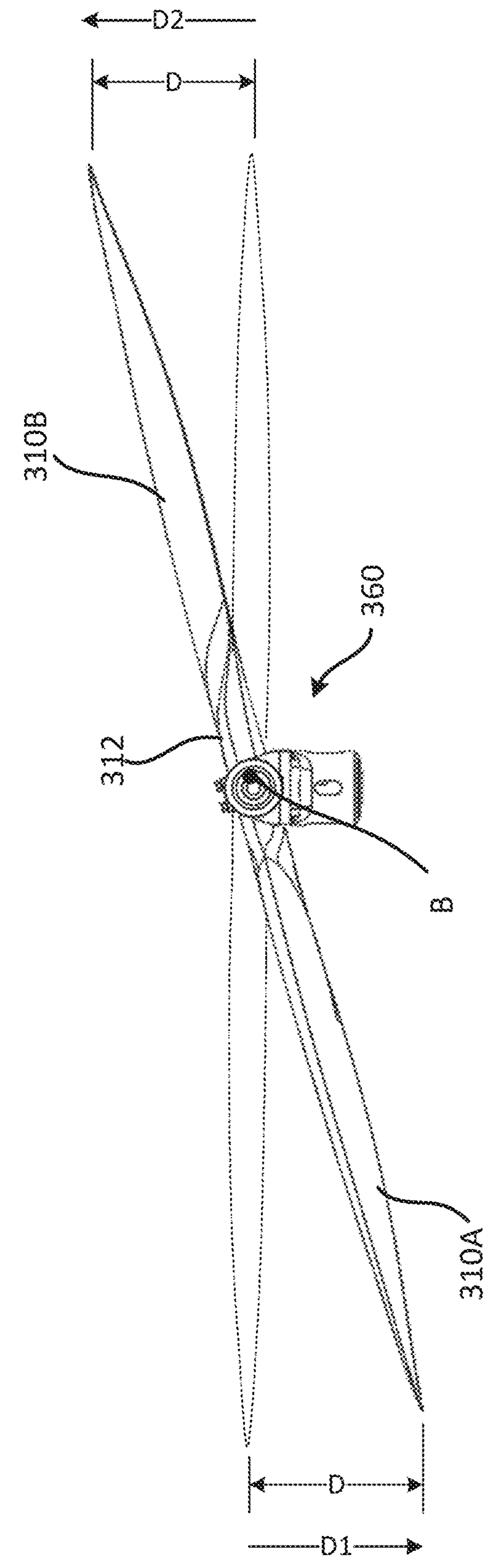
FIG. 6B is a side, span view of the example propulsor shown in FIGS. 3A-3C, in a deflected state.
Figure 6C:
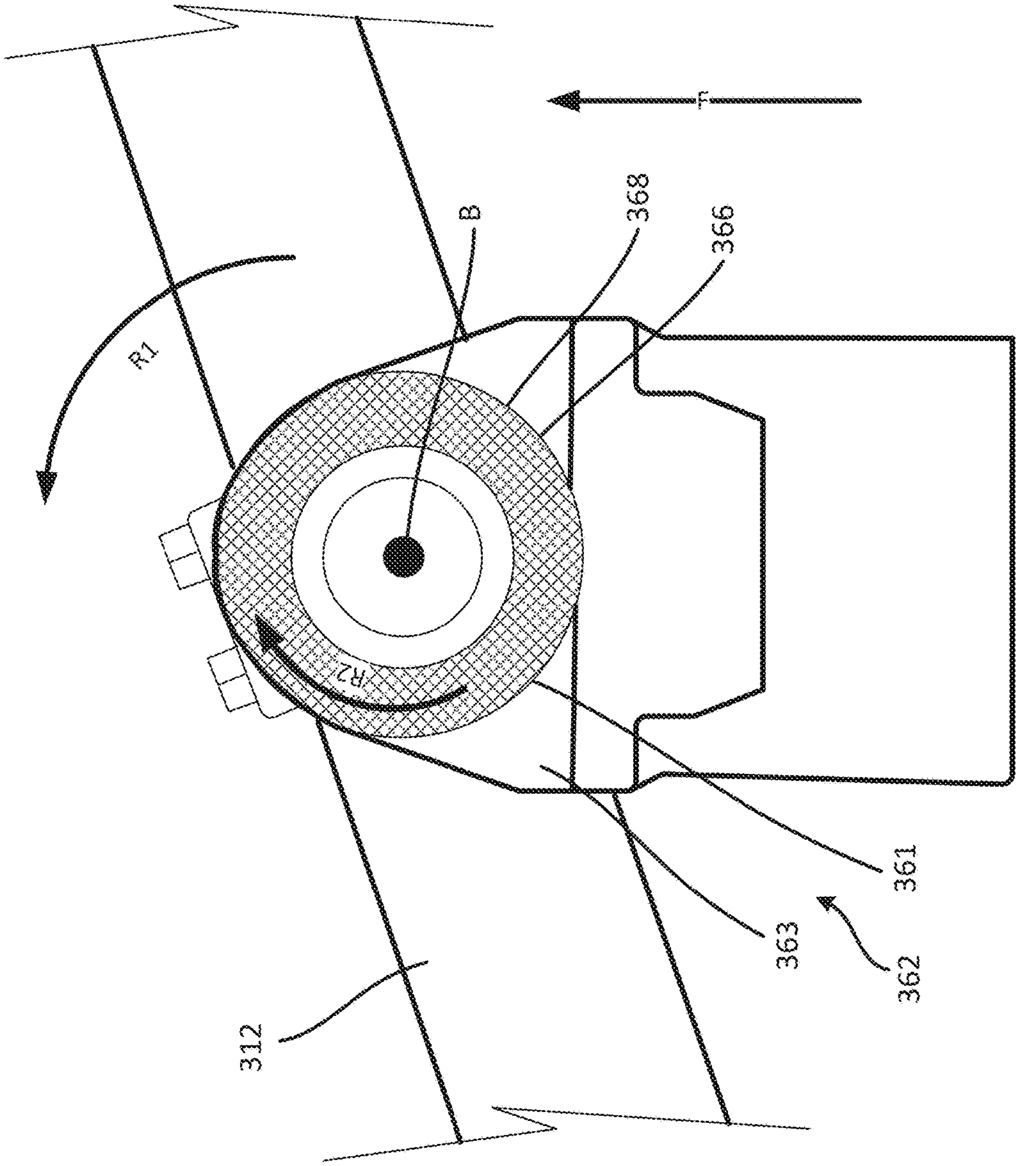
FIG. 6C is a close-in view of a bearing of the example propulsor shown in FIGS. 3A-3C.

FIGS. 6A-6C illustrate a teetering of the blade 310 in response to an application of an external force, such as, for example, an external force applied to the blade 310 in an edgewise flight condition, for example, during a transition between modes of flight (e.g., transition between the vertical flight mode of operation and the forward flight mode of operation), and the like. In particular, FIG. 6A is a side, span view of the propulsor 300. In the view shown in FIG. 6A, the propulsor 300 is in a neutral state. In response to an external force applied in the direction of the arrow F to the second blade portion 310B, the blade 310 is deflected as shown in FIG. 6B. That is, in response to the application of the external force to the second blade portion 310B in the direction of the arrow F, the blade 310 pivots, or teeters, in the direction of the arrow R1 about the axis B, as shown in FIG. 6C. This pivoting in the direction of the arrow R1 about the axis B in response to the externally applied force causes a deflection of the second blade portion 310B by a distance D in the direction of the arrow D2, and a deflection of the first blade portion 310A by a distance D in the direction of the arrow D1. In the example shown in FIG. 6B, the position of the blade 310 prior to application of the external force in the direction of the arrow F is shown in dashed lines, with the deflection by the distance D of the first and second blade portions 310A, 310B taken at the respective tip end portions of the first and second blade portions 310A, 310B, simply for purposes of discussion and illustration. In this example, the distance D by which the second blade portion 310B is deflected in the direction of the arrow D2 is substantially equal to and opposite the distance D by which the first blade portion 310A is deflected in the direction of the arrow D1.

As shown in FIG. 6C, in response to application of the external force in the direction of the arrow F to the second blade portion 310B, the blade 310 flaps, or teeters, about the axis B in the direction of the arrow R1 as described above. In response to the pivoting of the blade 310 in the direction of the arrow R1, the bearings 362, and in particular, the biasing members 361, or centering members, of the bearings 362, exert a biasing, or centering force, or a restoring moment, in the direction of the arrow R2. The biasing, or centering force, or restoring moment, in the direction of the arrow R2 is applied in a direction opposite the direction of the pivoting or teetering of the blade 310 about the axis B. The biasing, or centering force, or restoring moment, exerted in the direction of the arrow R2 slows, or retards, or damps, the pivoting of the blade 310 in the direction of the arrow R1, and urges a return of the blade 310 toward the neutral position shown in FIG. 6A. In an example in which the external force were applied in the direction of the arrow F to the first blade portion 310A (not shown in FIGS. 6A-6C), the blade 310 would flap, or teeter, about the axis B in the direction of the arrow R2, and the bearings 362 would exert a biasing force, or a centering force, or a restoring moment, in the direction of the arrow R1, urging a return of the blade 310 to the neutral position. In some examples, a magnitude of the biasing, or centering force, or restoring moment exerted by the bearings 362 is based on a stiffness of the biasing members 361, or centering members. In an example in which the biasing members 361, or centering members are elastomeric members, the magnitude of the biasing, or centering force, or restoring force exerted by the bearings 362 may be based on a stiffness provided by the elastomeric material of the elastomeric members, alone or in combination with a configuration of the biasing members 361, or centering members, including, for example, thickness, surface area, contact area, and the like.

The ability of the blade 310 of the propulsor 300 to passively flap, or teeter, or tilt, about the axis B in this manner, in response to an externally applied force allows these forces to be absorbed, or the energy associated with these forces to be driven into the bearings 362. These types of external forces may be experienced during edgewise flight, transition between flight modes and the like, for example an edgewise lift mismatch experienced by the first side portion 312A and the second side portion 312B during transition between flight modes.

In some examples, the propulsor 300 including the blade 310 coupled to the motor 220 by the coupling assembly 360, as described above, may be incorporated into an aircraft such as the example aircraft described above with respect to FIG. 1. In particular, the propulsor 300 described above may be employed by the example aircraft 100 described above with respect to FIG. 1, in one or more of the plurality of vertical lift propulsors generating vertical thrust during operation of the aircraft 100 in the vertical flight mode. In some examples, in which the aircraft employs a plurality of propulsors 300 as described above, the propulsors 300 may operate with the blade 310 at a fixed pitch, such that a pitch angle of the blade 310, and of the first blade portion 310A and the second blade portion 310B of the blade 310 are not adjustable. For example, the pitch of first blade portion 310A and second blade portion 310B cannot be adjusted in tandem, for example, via a cyclic control mechanism or via a collective control mechanism, or adjusted independently, for example, via individual blade control actuation. For example, in some examples, vertical propulsor assemblies of the present disclosure have a fixed pitch design and do not include cyclic or collective pitch adjustments. In some examples, in which the aircraft employs a plurality of propulsors 300 as described above, the respective monolithic blades 310 may operate at a fixed pitch, while varying the rotation speed (i.e., revolutions per minute, or RPM) of the individual propulsors to provide for control of the aircraft, for example, attitude control. In this type of arrangement, thrust may be controlled by varying the rotational speed of the individual propulsors, for example the four propulsor assemblies 110 of the example aircraft 100 described above, rather than varying a pitch of a propulsor to control thrust. This varying of the rotation speed of the individual propulsors 300 may be achieved by, for example, controlling an output torque from a power source, such as a motor, output to each of the individual propulsors 300. In this type of aircraft application, during the transition between thrust-borne flight and wing-borne flight, the propulsors 300 are rotating at various rotational speeds. In addition, aircraft of the present disclosure may be relatively large and relatively heavy compared to relatively small, unmanned drones and similar aircraft, thereby increasing the associated loads exerted on the vertical lift propulsor assemblies. For example, aircraft of the present disclosure may be manned or autonomous aircraft designed and configured to transport people and/or cargo. Aircraft of the present disclosure may be capable of a maximum takeoff weight in the range of approximately 5000 pounds to approximately 10,000 pounds, and in some examples, a maximum takeoff weight greater than 5,000 pounds, and in some examples, greater than 7,000 pounds, and in some examples, greater than 10,000 pounds. In this transitional phase of flight of the aircraft, in which the propulsors 300 are to be transitioned from a standby mode, or a stowed state, to an operational state, and experience relatively high loads at relatively high rotational speeds, a stiffness of the bearings 362 may be balanced with a rigidity of the blade 310 to allow for stable operation of the propulsors 300, and to reduce vibratory effects by transferring the energy into the bearings 362.

Figure 7:
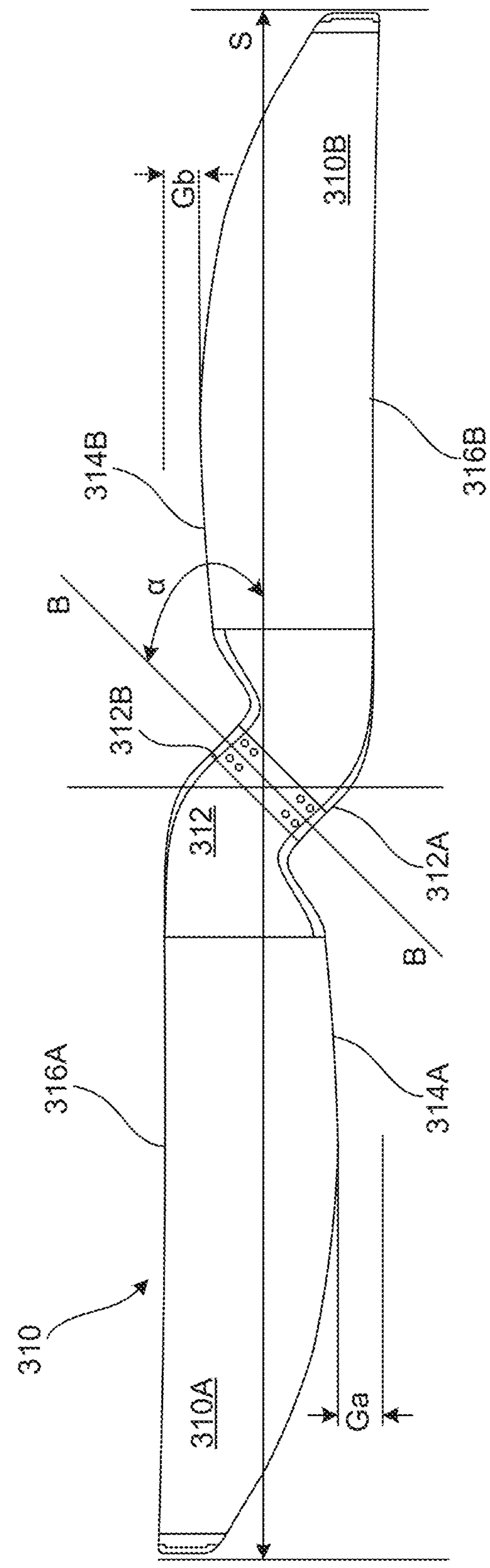
FIG. 7 is a plan view of an example monolithic blade of the example propulsor 3A-6C.

FIG. 7 is a plan view of the blade 310. As shown in FIG. 7, the blade 310 has a span S, extending from a tip end portion of the first blade portion 310A to a tip end portion of the second blade portion 310B. The hub portion 312 is formed between a root end portion of the first blade portion 310A and a root end portion of the second blade portion 310B. The first blade portion 310A includes a contoured edge portion 314A extending between a first end of the root end portion and a first end of the tip end portion of the first blade portion 310A. The first blade portion 310A includes a substantially flat edge portion 316A extending between a second end of the root end portion and a second end of the tip end portion of the first blade portion 310A. Similarly, the second blade portion 310B includes a contoured edge portion 314B extending between a first end of the root end portion and a first end of the tip end portion of the second blade portion 310B, and a substantially flat edge portion 316B extending between a second end of the root end portion and a second end of the tip end portion of the second blade portion 310B. In the example arrangement shown in FIG. 7, the contoured edge portion 314A of the first blade portion 310A (for example, the leading edge of the first blade portion 310A) is offset from the flat edge portion 316B of the second blade portion 310B (for example, the trailing edge portion of the second blade portion 310B), in a chord direction of the blade 310 by a distance Ga. Similarly, the contoured edge portion 314B of the second blade portion 310B (for example, the leading edge of the second blade portion 310B) is offset from the flat edge portion 316A of the first blade portion 310A (for example, the trailing edge of the first blade portion 310A) in a chord direction of the blade 310 by a distance Gb.

The hub portion 312 includes the first side portion 312A and the second side portion 312B, extending between the root end portions of the first blade portion 310A and the second blade portion 310B. The first side portion 312A and the second side portion 312B are flat, and are oriented at an angle relative to the span S of the blade 310. The flat contour of the blade 310 at the hub portion 312, and the angular orientation of the hub portion 312, provides for coupling of the bearings 362 of the coupling assembly 360 to the blade 310 as described above, allowing the blade 310 to pivot, or teeter, about the axis B. As shown in FIG. 7, the angular orientation of the hub portion 312 positions the axis B, about which the blade 310 pivots, or teeters, at an angle $\alpha$ with respect to the span S of the blade 310. In some examples, the angle $\alpha$, or the delta-3 angle, is between approximately 30 degrees and approximately 60 degrees. In some examples, the angle $\alpha$ is approximately 45 degrees.

In some examples, the blade 310 includes an outer structural layer that can include one or more plies of composite material, such as, for example, a carbon fiber material. In some examples, the outer structural layer extends substantially continuously through the hub portion 312 of the blade 310. In some examples, the outer structural layer extends from the tip end portion of the first blade portion 310A, through the hub portion 312, to the tip end portion of the second blade portion 310B. In some examples, the outer structural layer provides for structural support, and/or structural rigidity, of the blade 310. In some examples, at least one spar is included within an interior of the blade 310, for example, an interior space, or an interior volume, defined within the outer structural layer. In some examples, the spar extends through the hub portion 312 and into the first blade portion 310A and the second blade portion 310B. In some examples, the spar extends substantially from the tip end portion of the first blade portion 310A to the tip end portion of the second blade portion 310B of the blade 310. In some examples, a length, or a span, of the spar, may be less than a corresponding length, for example, the span S, of the blade 310. In some examples, end portions of the spar may be positioned at intermediate portions of the first blade portion 310A and the second blade portion 310B. In some examples, the spar is made of a composite material, such as, for example, a carbon fiber composite material. In some examples, a core material is received in an interior volume defined within the outer structural layer. In some examples, the core material is received in a space formed between the outer structural layer and the spar. In some examples, the core material is received in an interior volume formed within the spar. In some examples, the core material may include one or more types of foam materials, including, for example thermoset and thermoplastic polymers such as, for example, polyvinyl chloride (PVC), polyurethane (PU), polystyrene (PS), styrene acrylonitrile (SAN), polyetherimide (PEI), polymethacrylimide (PMI), and other such materials.

As noted above, the flat portions defined by the first side portion 312A and the second side portion 312B of the hub portion 312, the angled orientation of the first side portion 312A and the second side portion 312B, and the resulting outer mold line of the blade 310, accommodate the mounting of the bearings 362 of the coupling assembly 360 at the hub portion 312 of the blade 310 as described above. The offset distance Ga between the contoured edge portion 314A of the first blade portion 310A and the flat edge portion 316B of the second blade portion 310B, and the offset distance Gb between the contoured edge portion 314B of the second blade portion 310B and the flat edge portion 316A of the first blade portion 310A, together with the orientation of the hub portion 312 at the angle $\alpha$, together with the internal construction of the blade 310, allow the center of stiffness to be aligned with the center of gravity of the blade 310. This helps to avoid flutter and/or instability during operation of the propulsor 300.

As described above, the blade 310 includes the first blade portion 310A, the second blade portion 310B, and the hub portion 312 formed as a single element due to the monolithic structure of the outer structural layer described above. The blade 310 is configured to operate at a fixed pitch, i.e., without pitch control. The teetering mechanism defined by the coupling assembly 360 including the yoke 369, the bearings 362, and the brackets 364 allows the propulsor 300, including the blade 310, to passively pivot, or passively teeter, or passively flap, about the axis B, to alleviate the increasing edgewise lift mismatch between the first blade portion 310A and the second blade portion 310B at higher airspeeds, such as during transition between operation of the aircraft in the forward flight mode and operation in the vertical flight mode. In some situations, the angle $\alpha$, i.e., the delta-3 angle, for example, the 45 degree angle, between the teeter axis B about which the teeter mechanism (including the yoke 369, the bearings 362 and the brackets 364) allows the blade 310 to teeter, and the span S of the blade 310, together with the offset between the first and second blade portions 310A, 310B, may form a negative feedback loop, naturally providing some pitch variation which may augment the retarding, or restoring moment due to the biasing, or centering force, or restoring force, applied by the biasing members 361, or centering members of the bearings 362.

Figure 8A:
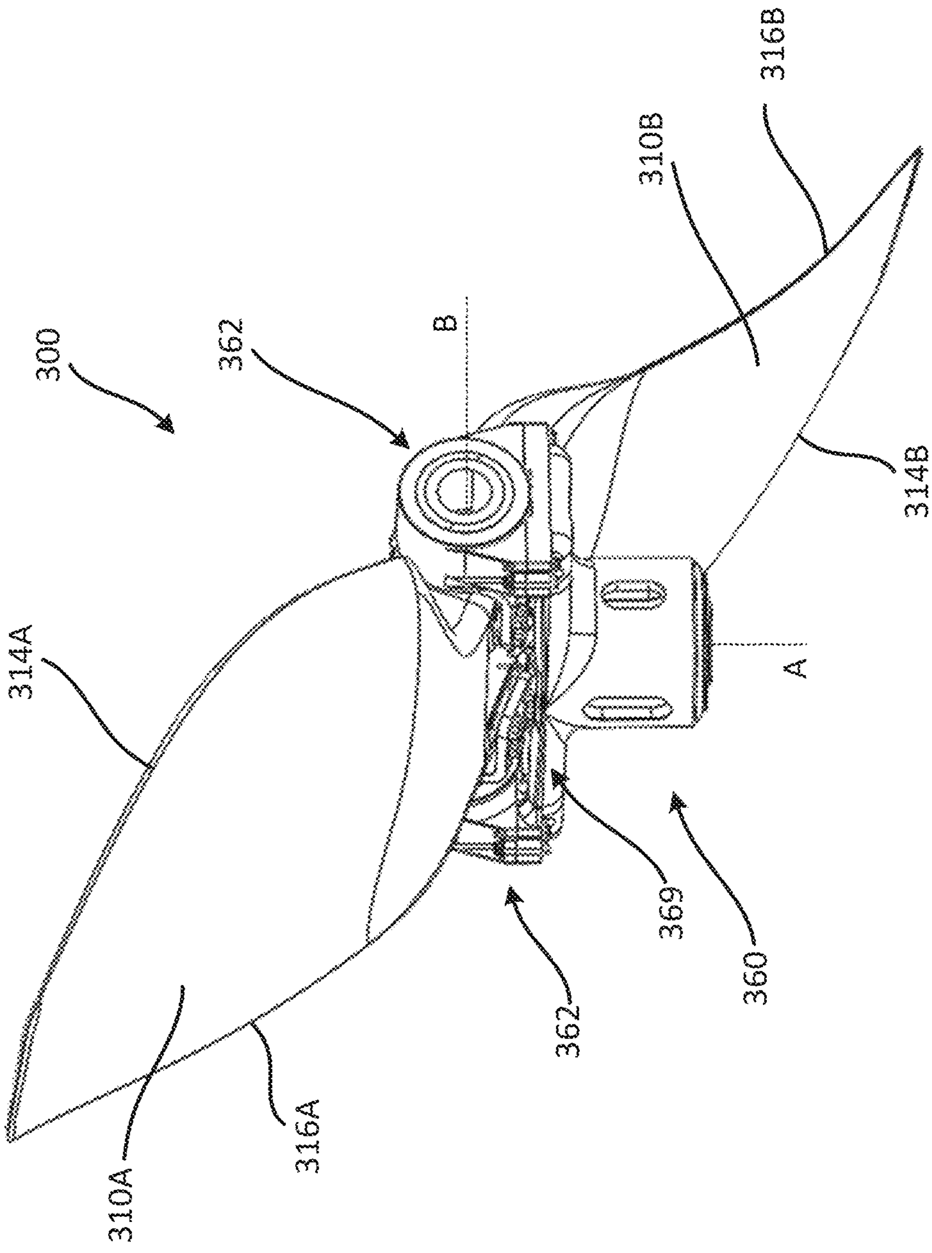
FIGS. 8A and 8B illustrate a teetering operation of the example propulsor shown in FIGS. 3A-7C.
Figure 8B:
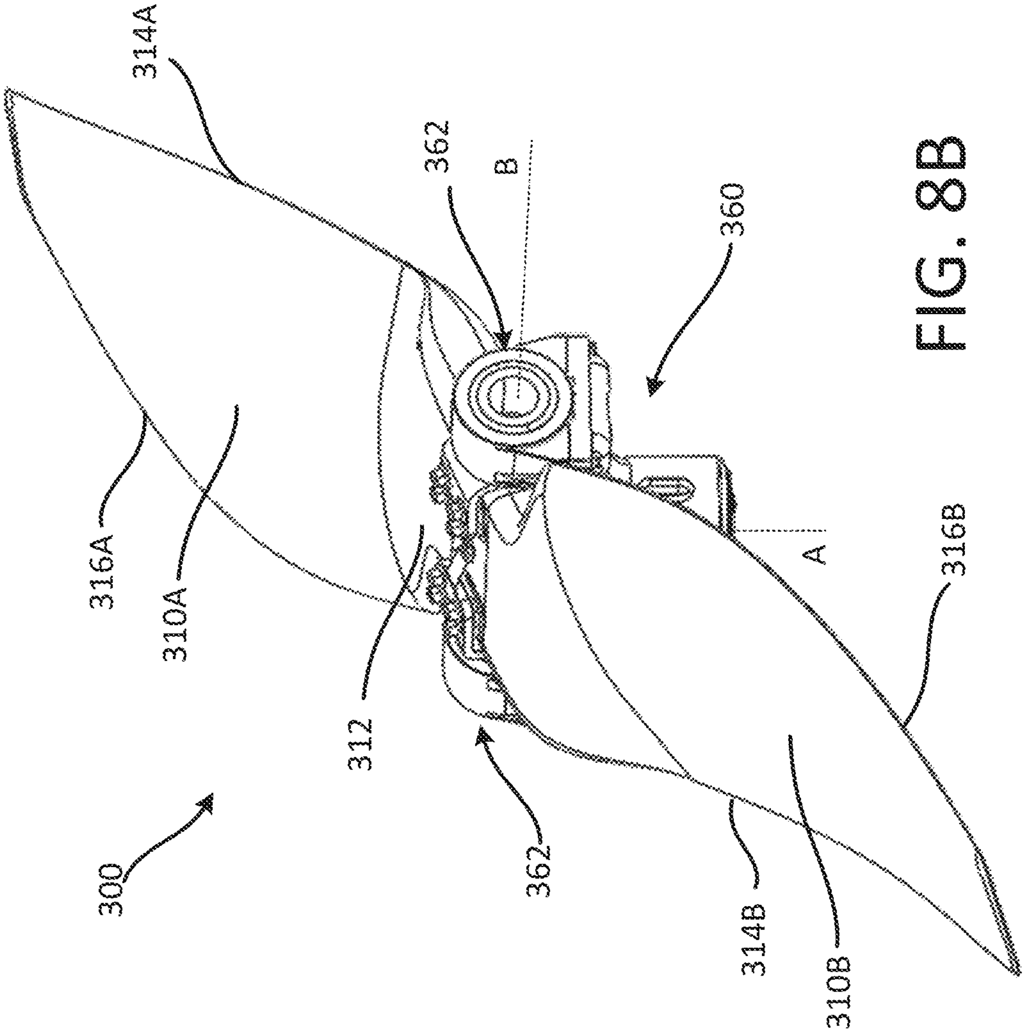

For example, in FIG. 8A, the first blade portion 310A has been deflected, for example, pivoted or teetered about the axis B, in response to an external force, for example an external force due to edgewise lift mismatch during a transition between the forward flight mode of operation and the vertical flight mode of operation. In the condition shown in FIG. 8A, the first blade portion 310A pitches up (while the second blade portion 310B pitches down). As the propulsor 300 continues to pivot, or teeter about the axis B during the transition, as shown in FIG. 8B, the first blade portion 310A goes from the pitched up position shown in FIG. 8A to a pitched down position shown in FIG. 8B (while the second blade portion 310B pitches up). This alternating natural variation in pitch may continue, for example, once per revolution, through the transition, thus augmenting the damping of vibratory forces generated during the transition.

In some examples, the propulsor 300 including the blade 310 coupled to the motor 220 by the coupling assembly 360 defining a teetering mechanism, as described above, may be incorporated into an aircraft such as the example aircraft described above with respect to FIG. 1. In particular, the propulsor 300 described above may be employed by the example aircraft 100 described above with respect to FIG. 1, in one or more of the plurality of vertical lift propulsors generating vertical thrust for operation of the aircraft 100 in the vertical flight mode. In some examples, in which the aircraft employs a plurality of propulsor assemblies, each including a propulsor 300 as described above, the propulsors 300 may operate with the blade 310 at a fixed pitch, such that a pitch angle of the blade 310, and of the first blade portion 310A and the second blade portion 310B of the blade 310 are not independently adjustable. In some examples, in which the aircraft employs a plurality of propulsors 300, such as, for example four propulsors 300 symmetrically arranged at two opposite lateral sides of the fuselage 102 in the example aircraft 100 described above, the respective monolithic blades 310 may operate at a fixed pitch, while varying the rotation speed (i.e., revolutions per minute, or RPM) of the individual propulsors 300 to provide for control of the aircraft 100. In this type of arrangement, thrust may be controlled by variation of the rotational speed of the individual propulsors 300, for example the four propulsor assemblies of the example aircraft 100 described above, rather than varying pitch of the individual propulsors 300 to control thrust. This varying of the rotation speed of the individual propulsors 300 may be achieved by, for example, controlling an output torque from a power source, such as a motor, output to each of the individual propulsors 300. In this type of aircraft application, during the transition between vertical flight and forward flight, the propulsors 300 may be rotating at various rotational speeds. In this transitional phase of flight of the aircraft 100, in which the propulsors 300 are to be transitioned from a standby mode, or a stowed state, to an operational state, and experience relatively high loads at relatively high rotational speeds, a stiffness of the bearings 362 may be balanced with a rigidity of the blade 310 to allow for stable operation of the propulsors 300, and to reduce vibratory effects by transferring the energy into the bearings 362.

The foregoing description has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

In some aspects, the techniques described herein relate to a propulsor assembly, including: a motor; a blade driven by the motor, the blade including: a hub portion; a first blade portion extending radially outward from the hub portion; and a second blade portion extending radially outward from the hub portion; and a coupling assembly coupling the blade to a shaft of the motor such that the blade rotates together with the shaft about a first axis, the coupling assembly including at least one bearing coupling the blade to the shaft of the motor, wherein the coupling assembly defines a teeter mechanism that allows for pivoting of the blade about a second axis extending through the hub portion and oriented at an angle with respect to the first axis in response to external forces applied to at least one of the first blade portion or the second blade portion of the blade, and a stiffness of the at least one bearing exerts a biasing force, or a centering force, or a restoring force, that urges the blade to a neutral position.

In some aspects, the techniques described herein relate to a propulsor assembly, wherein the coupling assembly also includes: a yoke coupled to the shaft of the motor; and at least one bracket coupled to a side portion of the hub portion of the blade.

In some aspects, the techniques described herein relate to a propulsor assembly, wherein the at least one bracket includes: a first arm portion fixed to an upper surface portion of the hub portion of the blade; a second arm portion fixed to a lower surface portion of the hub portion of the blade; and a base portion extending from the first arm portion and the second arm portion, and coupled in the at least one bearing.

In some aspects, the techniques described herein relate to a propulsor assembly, wherein the at least one bearing is a torsional bearing, including: an elastomeric member having an inner surface portion defining a central opening and an outer surface portion, wherein the base portion of the at least one bracket is coupled to one of the inner surface portion or the outer surface portion; and a bearing housing fixed to the yoke, wherein the elastomeric member is coupled to the bearing housing.

In some aspects, the techniques described herein relate to a propulsor assembly, wherein the outer surface portion of the elastomeric member is fixedly coupled to an inner surface portion of the bearing housing, and an inner surface portion of the elastomeric member is fixedly coupled to an outer surface portion of the base portion of the at least one bracket.

In some aspects, the techniques described herein relate to a propulsor assembly, wherein the elastomeric member is substantially cylindrical.

In some aspects, the techniques described herein relate to a propulsor assembly, wherein the elastomeric member is substantially conical.

In some aspects, the techniques described herein relate to a propulsor assembly, wherein the base portion and the elastomeric member are concentrically arranged about the second axis such that, in response to a pivoting of the blade in a first rotational direction about the second axis, the elastomeric member exerts a biasing force, or a centering force, or a restoring force on the hub portion of the blade in a second rotational direction that is opposite the first rotational direction.

In some aspects, the techniques described herein relate to a propulsor assembly, wherein, in response to the pivoting of the blade about the second axis, a displacement of a tip end portion of the second blade portion of the blade is opposite and substantially equal to a displacement of a tip end portion of the first blade portion of the blade.

In some aspects, the techniques described herein relate to a propulsor assembly, wherein the blade is a monolithic blade including the hub portion, the first blade portion, and the second blade portion formed as a single element.

In some aspects, the techniques described herein relate to a propulsor assembly, wherein a pitch angle of the first blade portion and the second blade portion are not independently adjustable.

In some aspects, the techniques described herein relate to a propulsor assembly, wherein the coupling assembly includes: a first bracket fixed to a first side portion of the hub portion of the blade; a second bracket fixed to a second side portion of the hub portion of the blade; a first elastomeric bearing coupled between the first bracket and a corresponding portion of a yoke coupled to the shaft of the motor; and a second elastomeric bearing coupled between the second bracket and a corresponding portion of the yoke.

In some aspects, the techniques described herein relate to a propulsor assembly, wherein at least one of the first elastomeric bearing or the second elastomeric bearing is a high capacity laminated bearing, wherein a stiffness of the first elastomeric bearing and the second elastomeric bearing restricts a pivoting motion of the blade about the second axis to within a preset range.

In some aspects, the techniques described herein relate to a propulsor assembly, wherein, in response to a pivoting of the blade in a first rotational direction about the second axis, the first elastomeric bearing and the second elastomeric bearing exert a biasing force, or a centering force, or a restoring force on the hub portion of the blade in a second rotational direction that is opposite the first rotational direction.

In some aspects, the techniques described herein relate to a propulsor assembly, wherein a combined stiffness of the first elastomeric bearing and the second elastomeric bearing is in a range of between approximately 120 foot-pounds of force per degree and approximately 150 foot-pounds of force per degree.

In some aspects, the techniques described herein relate to a propulsor assembly, wherein the second axis extends from a center of rotation of the first elastomeric bearing to a center of rotation of the second elastomeric bearing.

In some aspects, the techniques described herein relate to a propulsor assembly, wherein a central axis of the hub portion of the blade is offset from a central axis of the blade, the central axis of the blade corresponding to a span of the blade extending from a tip end portion of the first blade portion to a tip end portion of the second blade portion of the blade.

In some aspects, the techniques described herein relate to a propulsor assembly, wherein the second axis is oriented at approximately 45 degrees relative to a span of the blade extending from a tip end portion of the first blade portion to a tip end portion of the second blade portion of the blade.

In some aspects, the techniques described herein relate to a propulsor assembly, wherein, in response to an external force applied to one of the first blade portion or the second blade portion: the blade pivots about the second axis such that a plane of rotation of the blade is tilted; and a degree of pivoting of the blade is restricted in response to a biasing force, or a centering force, or a restoring force exerted by the at least one bearing.

In some aspects, the techniques described herein relate to a propulsor assembly, wherein a central span of the blade, extending from a tip end portion of the first blade portion to a tip end portion of the second blade portion, is substantially orthogonal to the second axis.

In some aspects, the techniques described herein relate to a propulsor assembly, wherein the second axis is substantially orthogonal to the first axis.

In some aspects, the techniques described herein relate to a propulsor assembly, wherein: a leading edge of the first blade portion is arranged in parallel to and offset from a trailing edge of the second blade portion in a chord direction of the blade; a leading edge of the second blade portion is arranged in parallel to and offset from a trailing edge of the first blade portion in the chord direction of the blade; and the hub portion is defined between a root end portion of the first blade portion and a root end portion of the second blade portion.

In some aspects, the techniques described herein relate to a propulsor assembly, wherein the hub portion is oriented at an angle with respect to the leading edge of the first blade portion and the leading edge of the second blade portion, and defines substantially flat portions configured to be coupled to the coupling assembly.

In some aspects, the techniques described herein relate to a propulsor assembly, wherein the propulsor assembly is a lift propulsor assembly included on an electric vertical takeoff and landing aircraft, the lift propulsor assembly generating vertical thrust.

In some aspects, the techniques described herein relate to a propulsor assembly, wherein the propulsor assembly includes four propulsor assemblies configured to be included on an electric aircraft.

In some aspects, the techniques described herein relate to a propulsor assembly, wherein the propulsor assembly includes four propulsor assemblies included on an electric aircraft operable in a vertical flight mode and a forward flight mode, each of the four propulsor assemblies generating vertical thrust.

In some aspects, the techniques described herein relate to a propulsor assembly, wherein a vertical orientation of the propulsor assemblies remains fixed such that the propulsor assemblies do not tilt forward.

In some aspects, the techniques described herein relate to an electric aircraft, including: a main body; and a plurality of lift propulsors coupled to the main body, each of the plurality of lift propulsors including: a unitary blade coupled to and driven by an electric motor such that the unitary blade rotates about a first axis in response to a driving force generated by the electric motor; and a flapping mechanism coupled between the unitary blade and the electric motor, the flapping mechanism including a plurality of torsional bearings coupled to a hub portion of the unitary blade such that the unitary blade flaps about a second axis that is different from the first axis.

In some aspects, the techniques described herein relate to an electric aircraft, wherein the electric aircraft is configured to transition between a vertical thrust-borne phase of flight and a wing-borne phase of flight.

In some aspects, the techniques described herein relate to an electric aircraft, wherein the plurality of lift propulsors includes four lift propulsors, respectively positioned at four quadrants of the main body of the electric aircraft.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "bottom," "lower," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The invention claimed is:

1. A propulsor assembly, comprising:
- a motor;
- a blade driven by the motor, the blade including:
  - a hub portion;
  - a first blade portion extending radially outward from the hub portion; and
  - a second blade portion extending radially outward from the hub portion; and
- a coupling assembly including a yoke coupled at an end of a shaft of the motor such that the yoke rotates together with the shaft about a first axis, the coupling assembly further including at least one bearing coupled to the yoke such that the at least one bearing is disposed adjacent a side of the hub portion and spaced outward from the side of the hub portion, the at least one bearing coupling the blade to the yoke such that the hub portion is spaced from the end of the shaft along the first axis,
- wherein the at least one bearing, in response to pivoting of the blade about a second axis extending through the hub portion and oriented at an angle with respect to the first axis, exerts a restoring force that urges the blade toward a neutral position; and
- wherein a central axis of the hub portion of the blade corresponding to the second axis is offset from a central axis of the blade, the central axis of the blade corresponding to a span of the blade extending from a tip end portion of the first blade portion to a tip end portion of the second blade portion of the blade.

2. The propulsor assembly of claim 1, wherein the coupling assembly further includes:
- at least one bracket coupled to the hub portion of the blade and supported by the at least one bearing such that the at least one bracket is rotatable about the second axis.

3. The propulsor assembly of claim 2, wherein the at least one bracket includes:
- a base portion rotatably coupled in the at least one bearing;
- a first arm portion supported by the base portion and extending away from the at least one bearing and toward the hub portion, the first arm portion configured to be fixed to an upper surface portion of the hub portion; and
- a second arm portion supported by the base portion and extending away from the at least one bearing toward the hub portion, the second arm portion configured to be fixed to a lower surface portion of the hub portion.

4. The propulsor assembly of claim 3, wherein the at least one bearing is a torsional bearing, including:
- an elastomeric member having an inner surface portion defining a central opening and an outer surface portion, wherein the base portion of the at least one bracket is coupled to one of the inner surface portion or the outer surface portion; and
- a bearing housing fixed to the yoke, wherein the elastomeric member is coupled to the bearing housing.

5. The propulsor assembly of claim 4, wherein the outer surface portion of the elastomeric member is fixedly coupled to an inner surface portion of the bearing housing, and the inner surface portion of the elastomeric member is fixedly coupled to an outer surface portion of the base portion of the at least one bracket.

6. The propulsor assembly of claim 4, wherein the elastomeric member has at least one of a cylindrical geometry or a conical geometry.

7. The propulsor assembly of claim 4, wherein the base portion and the elastomeric member are concentrically arranged about the second axis such that, in response to a pivoting of the blade in a first rotational direction about the second axis:
- the elastomeric member exerts the restoring force on the hub portion of the blade in a second rotational direction that is opposite the first rotational direction; and
- a displacement of a tip end portion of the second blade portion of the blade is opposite and equal to a displacement of a tip end portion of the first blade portion of the blade.

8. The propulsor assembly of claim 1, wherein the blade is a monolithic blade including the hub portion, the first blade portion, and the second blade portion formed as a single element.

9. The propulsor assembly of claim 1, wherein a pitch angle of the first blade portion and the second blade portion are not independently adjustable.

10. The propulsor assembly of claim 1, wherein the at least one bearing is a first elastomeric bearing, wherein the coupling assembly further includes:

a first bracket fixed to a first side portion of the hub portion of the blade;

a second bracket fixed to a second side portion of the hub portion of the blade; and a second elastomeric bearing, and wherein the first elastomeric bearing is coupled between the first bracket and a first portion of the yoke and the second elastomeric bearing is coupled between the second bracket and a second portion of the yoke.

11. The propulsor assembly of claim 10, wherein at least one of the first elastomeric bearing or the second elastomeric bearing is a laminated bearing, wherein a stiffness of the first elastomeric bearing and the second elastomeric bearing restricts a pivoting motion of the blade about the second axis to within a preset range, and wherein, in response to a pivoting of the blade in a first rotational direction about the second axis, the first elastomeric bearing and the second elastomeric bearing exert the restoring force on the hub portion of the blade in a second rotational direction that is opposite the first rotational direction.

12. The propulsor assembly of claim 10, wherein a stiffness of the first elastomeric bearing and the second elastomeric bearing is in a range of between 120 Ft-Lbf/degree and 150 Ft-Lbf/degree.

13. The propulsor assembly of claim 1, wherein the second axis is oriented at 45 degrees relative to a span of the blade extending from a tip end portion of the first blade portion to a tip end portion of the second blade portion of the blade.

14. The propulsor assembly of claim 1, wherein, in response to an external force applied to one of the first blade portion or the second blade portion:

the blade pivots about the second axis such that a plane of rotation of the blade is tilted relative to a plane of rotation of the blade in a neutral state;

a degree of pivoting of the blade is restricted in response to the restoring force exerted by the at least one bearing; and the restoring force exerted by the at least one bearing urges the blade back toward the neutral state.

15. The propulsor assembly of claim 1, wherein:

a leading edge of the first blade portion is arranged in parallel to and offset from a trailing edge of the second blade portion in a chord direction of the blade;

a leading edge of the second blade portion is arranged in parallel to and offset from a trailing edge of the first blade portion in the chord direction of the blade;

the hub portion is defined between a root end portion of the first blade portion and a root end portion of the second blade portion; and the hub portion is oriented at an angle with respect to the leading edge of the first blade portion and the leading edge of the second blade portion, and defines flat portions configured to be coupled to the coupling assembly.

16. The propulsor assembly of claim 1, wherein the yoke includes a platform portion to which the at least one bearing is mounted, and an attachment portion extending downward from the platform portion and configured to be coupled to the shaft, the attachment portion centered on the first axis.

17. The propulsor assembly of claim 1, wherein the at least one bearing is a first bearing and the side of the hub portion is a first side, the coupling assembly further including:

a second bearing coupled to the yoke such that the second bearing is disposed adjacent a second side of the hub portion and spaced outward from the second side of the hub portion, the second side opposite the first side;

a first bracket coupled to the hub portion at the first side and supported by the first bearing; and a second bracket coupled to the hub portion at the second side and supported by the second bearing.

18. The propulsor assembly of claim 17, wherein the first bracket is coupled to an upper surface portion of the hub portion, to a lower surface portion of the hub portion, and rotatably coupled in the first bearing, and wherein the second bracket is coupled to the upper surface portion of the hub portion, to the lower surface portion of the hub portion, and rotatably coupled in the second bearing.

19. The propulsor assembly of claim 17, wherein the coupling assembly further includes:

a first elastomeric member coupled to the first bracket and to a housing of the first bearing; and a second elastomeric member coupled to the second bracket and to a housing of the second bearing, wherein the first elastomeric member of the first bearing and the second elastomeric member of the second bearing exert respective torsional forces that urge the blade toward the neutral position.

* * * * *